US012652685B2

(12) United States Patent
Zhao et al.

(10) Patent No.: US 12,652,685 B2
(45) Date of Patent: Jun. 9, 2026

(54) RESOURCE CONFIGURATION METHOD, DEVICE, AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Shichang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 320 days.

(21) Appl. No.: 18/382,088

(22) Filed: Oct. 20, 2023

(65) Prior Publication Data

US 2024/0049263 A1 Feb. 8, 2024

Related U.S. Application Data

(63) Continuation of application No. PCT/CN2022/084755, filed on Apr. 1, 2022.

(30) Foreign Application Priority Data

Apr. 21, 2021 (WO) ................ PCT/CN2021/088790
Oct. 19, 2021 (WO) ................ PCT/CN2021/124778

(51) Int. Cl.
| | | |
|---|---|---|
| *H04W 72/40* | (2023.01) | |
| *H04W 72/0446* | (2023.01) | |
| *H04W 72/0453* | (2023.01) | |

(52) U.S. Cl.
CPC ....... *H04W 72/40* (2023.01); *H04W 72/0446* (2013.01); *H04W 72/0453* (2013.01)

(58) Field of Classification Search
CPC ... H04W 7/40; H04W 72/02; H04W 72/0446; H04W 72/0453; H04W 72/40
See application file for complete search history.

(56) References Cited

U.S. PATENT DOCUMENTS

| | | |
|---|---|---|
| 2020/0053704 A1 | 2/2020 | Kim et al. |
| 2020/0205182 A1 | 6/2020 | Yamamoto et al. |
| | (Continued) | |

FOREIGN PATENT DOCUMENTS

| | | |
|---|---|---|
| CN | 110475343 A | 11/2019 |
| CN | 110945937 A | 3/2020 |
| | (Continued) | |

OTHER PUBLICATIONS

Extended European search report of counterpart European application No. 22790840.7 issued on Sep. 13, 2024.
Communication pursuant to Article 94(3) EPC of counterpart European application No. 22790840.7 issued on Jun. 23, 2025.
International Search Report and Written Opinion dated Jun. 29, 2022 in International Application No. PCT/ CN2022/084755. English translation attached.
International Search Report and Written Opinion dated Jan. 12, 2022 in International Application No. PCT/CN2021/088790. English translation attached.

(Continued)

*Primary Examiner* — Donald L Mills
(74) *Attorney, Agent, or Firm* — Sheppard, Mullin, Richter & Hampton LLP

(57) ABSTRACT

The embodiments of the present disclosure provide a resource configuration method, a device, and a storage medium. The method includes: obtaining, by a terminal device, first configuration information, the first configuration information being used for configuring sidelink communication resources; obtaining, by the terminal device, a structure of a resource allocation unit according to the first configuration information; and allocating, by the terminal device, one or more resource allocation units for sidelink communication of the terminal device. In this way, the flexibility of resource allocation can be improved.

20 Claims, 14 Drawing Sheets

(56) References Cited

U.S. PATENT DOCUMENTS

| 2020/0351033 | A1 | | 11/2020 | Ryu et al. | |
|---|---|---|---|---|---|
| 2021/0329633 | A1 | * | 10/2021 | Xing | H04W 72/0446 |
| 2022/0124682 | A1 | * | 4/2022 | Ko | H04W 72/02 |
| 2022/0159674 | A1 | * | 5/2022 | Deng | H04W 72/23 |
| 2025/0133596 | A1 | * | 4/2025 | Fan | H04L 27/0006 |

FOREIGN PATENT DOCUMENTS

| CN | 111148240 | A | 5/2020 |
|---|---|---|---|
| CN | 111435909 | A | 7/2020 |
| CN | 111726867 | A | 9/2020 |
| CN | 111800244 | A | 10/2020 |
| WO | 2020025040 | A1 | 2/2020 |
| WO | 2020061821 | A1 | 4/2020 |
| WO | 2020088609 | A1 | 5/2020 |
| WO | 2020172576 | A1 | 8/2020 |
| WO | 2021055648 | A1 | 3/2021 |

OTHER PUBLICATIONS

International Search Report and Written Opinion dated Jan. 26, 2022 in International Application No. PCT/CN2021/124778. English translation attached.

Huawei et al. "R1-1910059 Sidelink physical layer procedures for NR V2X" 3GPP TSG RAN WG1Meeting #98bis, Oct. 8, 2019 (Oct. 8, 2019), sections 2.3-2.4.

"3rd Generation Partnership Project;Technical Specification Group Radio Access Network;Evolved Universal Terrestrial Radio Access (E-UTRA); Radio Resource Control (RRC);Protocol specification(Release 15)" 3GPP TS 36.331 V15.4.0, Sep. 2018.

"3rd Generation Partnership Project; Technical Specification Group Radio Access Network; NR;Radio Resource Control (RRC) protocol specification(Release 16)" 3GPP TS 38.331 V16.3.1,Jan. 2021.

* cited by examiner

Network Device 101

Terminal Device 102            Terminal Device 103

——Sidelink Comm

Network Device 201

Terminal Device 202            Terminal Device 203

——Sidelink Comm

Terminal Device 301            Terminal Device 302

——Sidelink Comm

UE1        Data        UE2

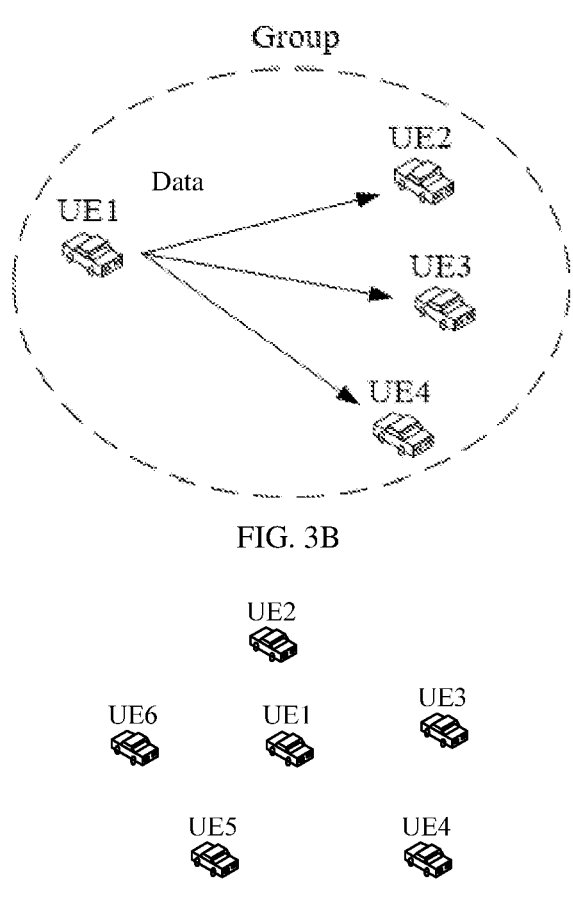
FIG. 3B
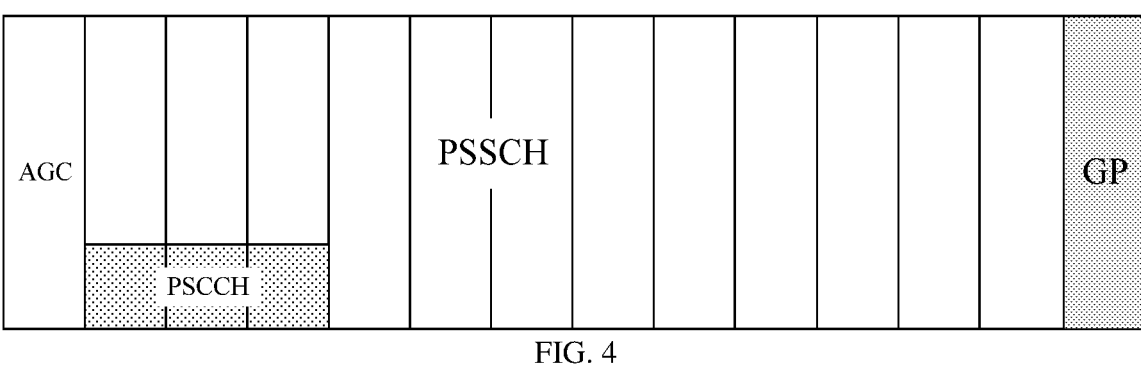
FIG. 3C
FIG. 4
FIG. 5

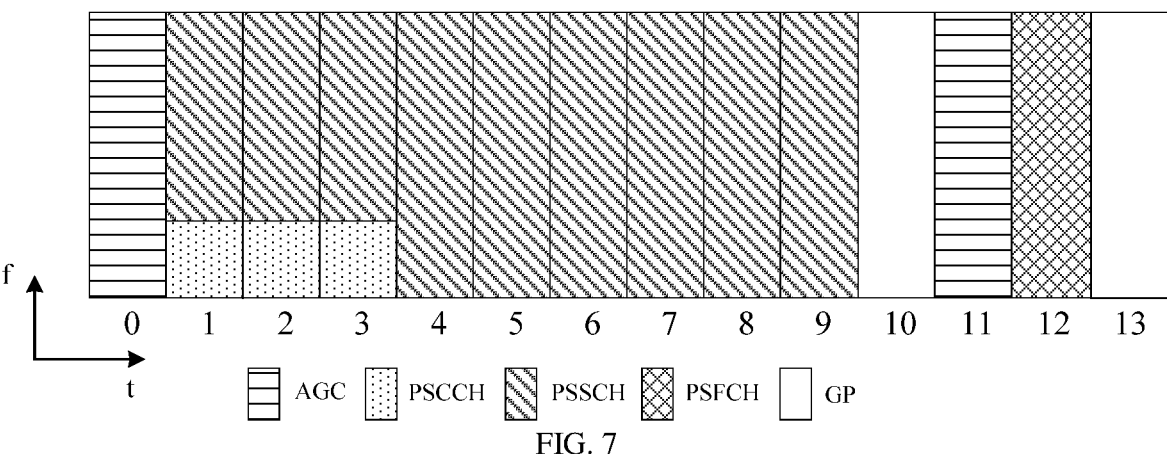

AGC     PSCCH     PSSCH     PSFCH     GP

FIG. 7

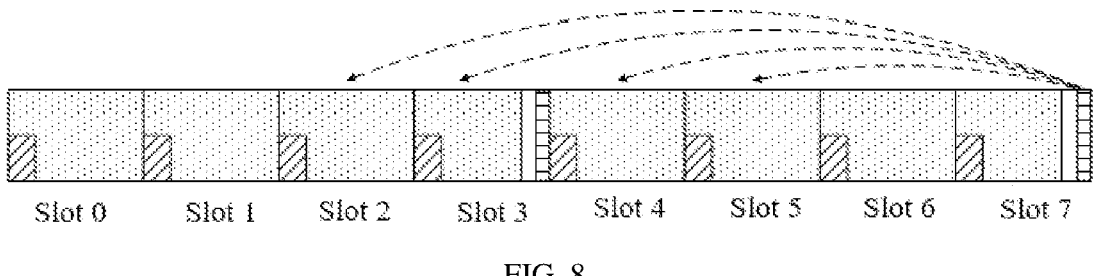

Slot 0     Slot 1     Slot 2     Slot 3     Slot 4     Slot 5     Slot 6     Slot 7

S901: Obtain first configuration information, the first configuration information being used for configuring sidelink communication resources S902: Obtain a structure of a resource allocation unit according to the first configuration information S903: Allocate one or more resource allocation units for sidelink communication of the terminal device

FIG. 9

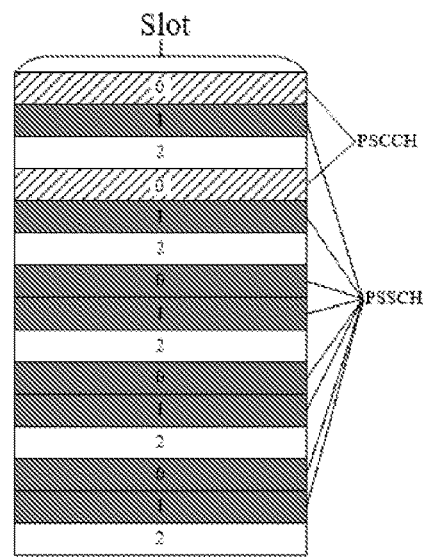
FIG. 18
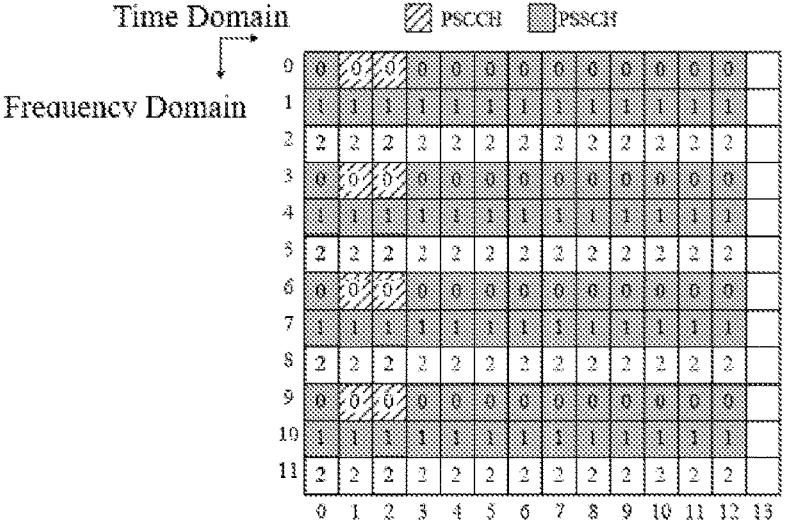
FIG. 19
FIG. 20

2700

2710

2720

RESOURCE CONFIGURATION METHOD, DEVICE, AND STORAGE MEDIUM

CROSS-REFERENCE TO RELATED APPLICATIONS

The present application is a continuation of International Application No. PCT/CN2022/084755 filed on Apr. 1, 2022, which claims benefits from PCT Application No. PCT/CN2021/088790, titled "RESOURCE CONFIGURATION METHOD, DEVICE, AND STORAGE MEDIUM", filed with the CNIPA on Apr. 21, 2021, and PCT Application No. PCT/CN2021/124778, titled "RESOURCE CONFIGURATION METHOD, DEVICE, AND STORAGE MEDIUM", filed with the CNIPA on Oct. 19, 2021, each of which is incorporated herein by reference in its entirety.

TECHNICAL FIELD

The embodiments of the present disclosure relate to communication technology, and more particularly, to a resource configuration method, a device, and a storage medium.

BACKGROUND

Unlike the traditional cellular system which communication data is received or transmitted via a base station, Sidelink (SL) communication allows devices to communicate directly with each other. Therefore, the sidelink has higher spectral efficiency and lower transmission delay.

The extension of sidelink communication to unlicensed spectrum is currently being investigated. In order to allow various communication systems that use unlicensed spectrum for wireless communication to coexist friendly on the spectrum, some countries or regions have stipulated regulatory requirements that must be met when using unlicensed spectrum. For example, there are regulatory requirements such as, if a terminal wants to use an unlicensed frequency band for communication, the frequency band occupied by the terminal needs to be greater than or equal to 80% of the system bandwidth.

However, in the Long Term Evolution (LTE) system and the New Radio (NR) system, sidelink communication is designed based on communication in licensed spectrum. In order to meet regulatory requirements for communication on unlicensed spectrum, current sidelink communication needs to be improved.

SUMMARY

The embodiments of the present disclosure provide a resource configuration method, a terminal device and a network device.

In a first aspect, an embodiment of the present disclosure provides a resource configuration method. The method is applied in a terminal device, and the method includes:

obtaining first configuration information, the first configuration information being used for configuring sidelink communication resources;

obtaining a structure of a resource allocation unit according to the first configuration information; and allocating one or more resource allocation units for sidelink communication of the terminal device.

In a second aspect, an embodiment of the present disclosure further provides a terminal device. The terminal device includes:

a processor, a memory, and an interface configured to communicate with a terminal device, wherein the memory stores computer-executable instructions; and the processor executes the computer-executable instructions stored in the memory, such that the processor performs the resource configuration method according to the first aspect.

In a third aspect, an embodiment of the present disclosure further provides a network device. The network device includes:

a processor, a memory, and an interface configured to communicate with a terminal device, wherein the memory stores computer-executable instructions; and the processor executes the computer-executable instructions stored in the memory, such that the processor performs a resource configuration method. The method includes:

determining sidelink communication resources; and transmitting first configuration information, the first configuration information being used for configuring the sidelink communication resources and the first configuration information comprising information used for obtaining a structure of a resource allocation unit.

BRIEF DESCRIPTION OF DRAWINGS

FIG. 3B is a schematic diagram showing a multicast transmission mode according to an embodiment of the present disclosure;

FIG. 3C is a schematic diagram showing a broadcast transmission mode according to an embodiment of the present disclosure;

FIG. 4 is a schematic diagram showing a time slot structure according to an embodiment of the present disclosure;

FIG. 5 is another schematic diagram showing a time slot structure according to an embodiment of the present disclosure;

FIG. 7 is another schematic diagram showing a time slot structure according to an embodiment of the present disclosure;

FIG. 8 is a schematic diagram showing a correspondence between a PSSCH and a PSFCH according to an embodiment of the present disclosure;

FIG. 9 is a schematic flowchart illustrating a resource configuration method according to an embodiment of the present disclosure;

FIG. 18 is a schematic diagram showing a second multiplexing mode of a PSCCH and a PSSCH according to an embodiment of the present disclosure;

FIG. 19 is a schematic diagram showing a third multiplexing mode of a PSCCH and a PSSCH according to an embodiment of the present disclosure;

FIG. 20 is another schematic diagram showing a third multiplexing mode of a PSCCH and a PSSCH according to an embodiment of the present disclosure;

DESCRIPTION OF EMBODIMENTS

Figures 1, 2, 3, 3A:
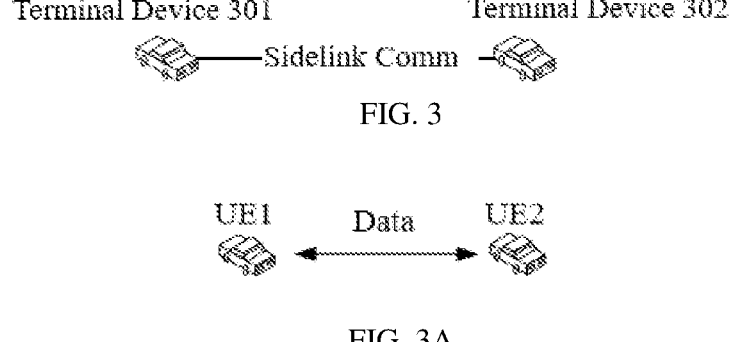
FIG. 1 is a schematic diagram showing a communication system applicable to an embodiment of the present disclosure.
FIG. 2 is another schematic diagram showing a communication system applicable to an embodiment of the present disclosure.
FIG. 3 is another schematic diagram showing a communication system applicable to an embodiment of the present disclosure.
FIG. 3A is a schematic diagram showing a unicast transmission mode according to an embodiment of the present disclosure.

In order to make the objects, solutions, and advantages of the embodiments of the present disclosure clearer, the technical solutions in the embodiments of the present disclosure will be described clearly and completely below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The terms "first", "second" and the like in the description, claims, and drawings of the embodiments of the present disclosure are used to distinguish similar objects from one another, and are not necessarily used to describe a specific order or sequence. It is to be understood that the terms so used are interchangeable under appropriate circumstances such that the embodiments of the present disclosure described herein can be for example implemented in orders other than those illustrated or described herein. Furthermore, the terms "including" and "having", as well as any variants thereof, are intended to cover a non-exclusive inclusion. For example, a process, method, system, product, or device including a sequence of steps or elements is not necessarily limited to the explicitly listed steps or elements, but may instead include other steps or elements not explicitly listed or inherent to the process, method, product, or device.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

Depending on the network coverage status of communicating terminals, sidelink communications can be divided into sidelink communication within network coverage, sidelink communication with partial network coverage, and sidelink communication out of network coverage.

The technical solutions of the embodiments of the present disclosure can be applied to various communication systems, for example: the Long Term Evolution (LTE) system, the LTE Frequency Division Duplex (FDD) system, the LTE Time Division Duplex (TDD) system, the $5^{th}$ Generation (5G) communication system, the future communication system (such as the $6^{th}$ Generation (6G) communication system), or a system integrating multiple communication systems, etc. The embodiments of the present disclosure are not limited to any of these examples. Here, 5G can also be referred to as New Radio (NR).

The technical solutions according to the embodiments of the present disclosure can be applied to various communication scenarios, e.g., one or more of the following communication scenarios: eMBB communication, URLLC, Machine Type Communication (MTC), mMTC, Device-to-Device (D2D) communication, Vehicle to Everything (V2X) communication, Vehicle to Vehicle (V2V) communication, Vehicle to Network (V2N), Vehicle to Infrastructure (V21), Vehicle to Pedestrian (V2P), and Internet of Things (IoT), etc. Optionally, mMTC may include one or more of the following communications: communications in Industrial Wireless Sensor Network (IWSN), communications in video surveillance scenarios, and communications in wearable devices, etc. As shown in FIG. 1, in the sidelink communication within network coverage, all terminals (e.g., terminal device 102 and terminal device 103) performing sidelink communication are within the coverage of one network device (e.g., network device 101), and thus all the terminals can perform sidelink communication based on a same sidelink configuration by receiving configuration signaling from the network device.

As shown in FIG. 2, in the sidelink communication with partial network coverage, some terminal devices (e.g., terminal device 202) performing sidelink communication are located within the coverage of the network device 201. These terminal devices can receive configuration signaling from the base station and perform sidelink communication according to the configuration of the network device 201. However, terminal devices (e.g., terminal device 203) located outside the network coverage cannot receive configuration signaling from the network device 201. In this case, the terminal devices outside the network coverage will use pre-configuration information and information carried in a Physical Sidelink Broadcast Channel (PSBCH) transmitted by the terminal devices located within the network coverage to determine the sidelink configuration for sidelink communication.

As shown in FIG. 3, for sidelink communication out of network coverage, all terminals (e.g., terminal device 301 and terminal device 302) performing sidelink communication are located outside the network coverage, and all the terminals determine the sidelink configuration based on pre-configuration information for sidelink communication.

The terminal device involved in the embodiments of the present disclosure may also be referred to as a terminal. A terminal may be a device with a wireless transceiver function. The terminal device can be deployed on land, including indoor or outdoor, handheld, or vehicle-mounted, deployed on water (e.g., on a ship), or deployed in the air (e.g., on an airplane, a balloon, a satellite, etc.). The terminal device may be a User Equipment (UE), which includes a handheld device, a vehicle-mounted device, a wearable device, or a computing device having a wireless communication function. For example, the UE may be a mobile phone, a tablet computer or a computer with a wireless transceiver function. The terminal device may be a Virtual Reality (VR) terminal device, an Augmented Reality (AR) terminal device, a wireless terminal in industrial control, a wireless terminal in self driving, a wireless terminal in remote medical, a wireless terminal in smart grid, a wireless terminal in smart city, and/or a wireless terminal device in smart home.

The network device involved in the embodiments of the present disclosure include a Base Station (BS), which may be a device deployed in a radio access network and capable of performing wireless communication with a terminal device. A base station may be in various forms, such as a macro base station, a micro base station, a relay station, or an access point. The base station involved in the embodiments of the present disclosure may be a base station in a 5G system, a base station in an LTE system, or a base station in another system, among others. Here, the base station in the 5G system may also be referred to as a Transmission Reception Point (TRP) or a next-generation Node B (gNB or gNodeB). Here, the base station may be an integrated base station, or may be a base station separated into multiple network elements, as non-limiting examples. For example, the base station may be a base station in which a Centralized Unit (CU) and a Distributed Unit (DU) are separated, that is, the base station includes a CU and a DU.

The relevant technologies and terms involved in present disclosure will be described below.

1. D2D/V2X Transmission Resource Selection Mode

The 3GPP defines two transmission resource selection modes for direct communication between terminal devices:

Mode 1: Transmission resources of a terminal device are allocated by a network device, and the terminal device transmits data on a sidelink according to the resources allocated by the network device. The network device can allocate resources for a single transmission to the terminal device, or allocate resources for semi-static transmissions to the terminal device. The terminal device is located within the network coverage, and the network allocates transmission resources for sidelink transmission to the terminal device.

Mode 2: A terminal device selects resources from a resource pool for data transmission. As shown in FIG. 3, the terminal device is located outside the cell coverage, and the terminal device autonomously selects transmission resources from the pre-configured resource pool for sidelink transmission. Alternatively, as shown in FIG. 1, the terminal device autonomously selects transmission resources from the resource pool configured by the network for sidelink transmission.

2. NR-V2X Transmission Scheme

In NR-V2X, autonomous driving needs to be supported, and thus higher requirements are imposed on data interaction between vehicles, such as higher throughput, lower latency, higher reliability, larger coverage, and more flexible resource allocation, etc. In LTE-V2X, broadcast transmission is supported, and in NR-V2X, unicast and multicast transmissions are further introduced. For unicast transmission, there is only one terminal as the receiver, as shown in FIG. 3A, in which unicast transmission is performed between UE1 and UE2. For multicast transmission, its receivers include all terminals in a communication group, as shown in FIG. 3B, in which UE1, UE2, UE3 and UE4 form a communication group, and UE1 transmits data and other terminal devices in the group are receiving terminals; or include all terminals within a certain transmission distance. For broadcast transmission mode, its receivers may include any terminal around the transmitting terminal, as shown in FIG. 3C, in which UE1 is the transmitting terminal, and other terminals around it, UE2-UE6, are all receiving terminals.

3. NR-V2X System Frame Structure

Time slot structures in NR-V2X are shown in FIGS. 4 and 5. The time slot shown in FIG. 4 is a time slot structure not including a Physical Sidelink Feedback Channel (PSFCH); and the time slot shown in FIG. 5 is a time slot structure including a PSFCH channel.

In NR-V2X, the Physical Sidelink Control Channel (PSCCH) starts with the second sidelink symbol of the time slot in the time domain and occupies 2 or 3 Orthogonal Frequency Division Multiplexing (OFDM) symbols, and may occupy {10, 12 15, 20, 25} Physical Resource Blocks (PRBs) in the frequency domain. In order to reduce the number of the UE's blind detections of the PSCCH, only one number of PSCCH symbols and one number of PRBs are allowed to be configured in one resource pool. In addition, since a sub-channel is the minimum granularity of resource allocation for the Physical Sidelink Shared Channel (PSSCH) in NR-V2X, the number of PRBs occupied by the PSCCH must be smaller than or equal to the number of PRBs in one sub-channel in the resource pool, so as not to impose additional restrictions on PSSCH resource selection or allocation. The PSSCH also starts with the second sidelink symbol of the time slot in the time domain, the last time domain symbol in the time slot is a Guard Period (GP) symbol, and the remaining symbols are mapped to the PSSCH, as shown in FIG. 4. The first sidelink symbol in this time slot is a repetition of the second sidelink symbol.

Typically, the receiving terminal uses the first sidelink symbol as an Automatic Gain Control (AGC) symbol, and the data on the symbol is generally not used for data demodulation. The PSSCH occupies K subchannels in the frequency domain, and each subchannel includes N consecutive PRBs.

When a time slot contains a PSFCH, the second-to-last and third-to-last symbols in the time slot are used for PSFCH transmission, and the time-domain symbol before the PSFCH channel is used as a GP symbol, as shown in FIG. 5.

4. Two-Stage Sidelink Control Information (SCI) Mechanism in NR-V2X

Figure 6:
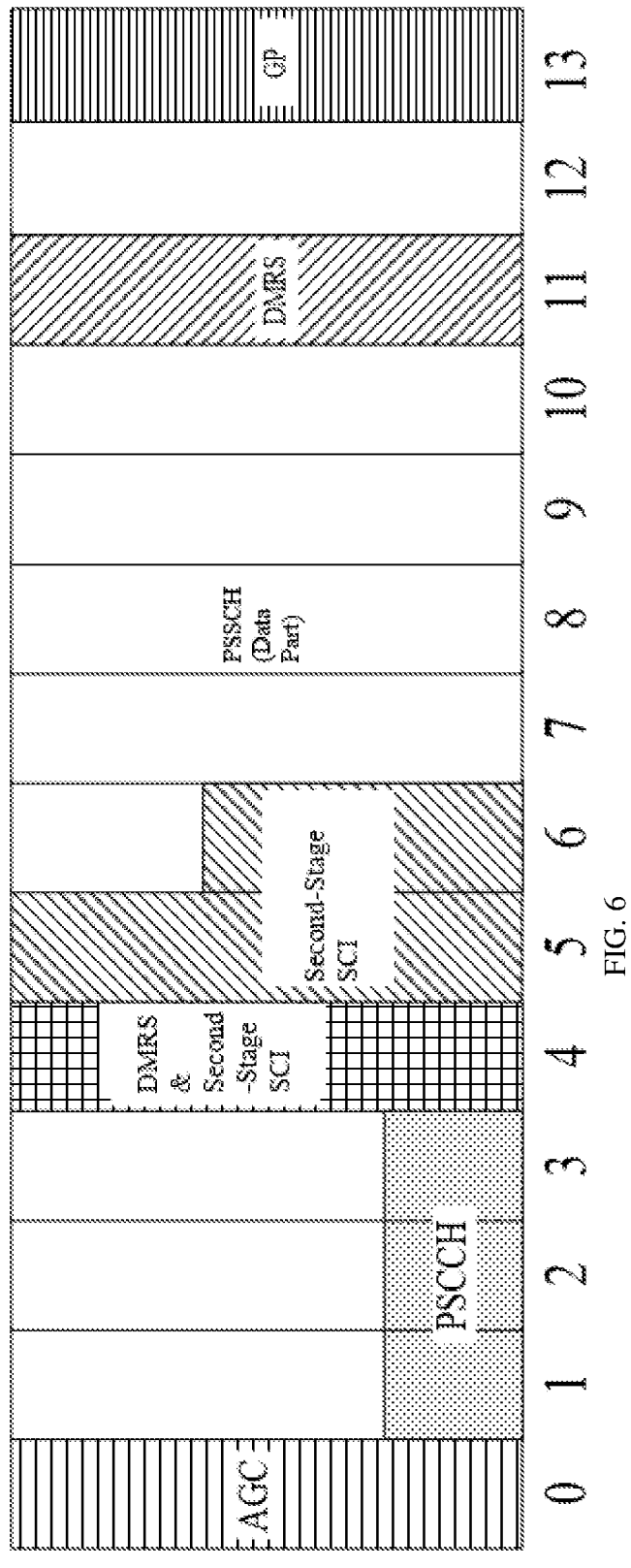
FIG. 6 is a schematic diagram showing two-stage SCI according to an embodiment of the present disclosure.

In NR-V2X, two-stage SCI is introduced. As shown in FIG. 6, the first-stage SCI is carried in a PSCCH, and indicates transmission resources, reserved resource information, Modulation and Coding Scheme (MCS) level, priority and the like of a PSSCH. The second-stage SCI is transmitted in the resources of the PSSCH and demodulated using the Demodulation Reference Signal (DMRS) of the PSSCH, and indicates a transmitter Identifier (ID), a receiver ID, a Hybrid Automatic Repeat reQuest (HARM) ID, a New Data Indicator (NDI) and the like for data demodulation. The second-stage SCI is mapped start from the first DMRS symbol of the PSSCH, first in the frequency domain and then in the time domain. As shown in FIG. 6, the PSCCH occupies 3 symbols (Symbol 1, Symbol 2, and Symbol 3), the DMRS of the PSSCH occupies Symbol 4 and Symbol 11, the second-stage SCI is mapped start from Symbol 4 and frequency division multiplexed with the DMRS on Symbol 4, and the second-stage SCI is mapped to Symbol 4, Symbol 5, and Symbol 6. The resource size occupied by the second-stage SCI depends on the number of bits in the second-stage SCI.

5. PSFCH Format

In NR-V2X, the PSFCH is introduced, which only carries 1-bit HARQ-ACK information and occupies 2 time-domain symbols in the time domain (the second symbol carries sidelink feedback information, and the data on the first symbol is a copy of the data on the second symbol, but this symbol is used as AGC) and 1 PRB in the frequency domain. In one time slot, the structures of PSFCH and PSSCH/PSCCH are shown in FIG. 7, which schematically shows positions of time domain symbols occupied by PSFCH, PSCCH, and PSSCH in one time slot. In one time slot, the last symbol is used as GP, the last-but-one symbol is used for PSFCH transmission, the data on the last-but-two symbol is the same as the data on the last-but-one symbol (i.e., the PSFCH symbol) and used as AGC, and the last-but-three symbol is also used as GP, the first symbol in the time slot is used as AGC, and the data on this symbol is the same as the data on the second time domain symbol in the time slot. The PSCCH occupies 3 time domain symbols, and the remaining symbols can be used for PSSCH transmission.

6. Resource for Sidelink Feedback Channel

In order to reduce the overhead of PSFCH, one time slot in every N time slots is defined to include a PSFCH transmission resource, that is, the cycle of sidelink feedback resources is N time slots, where N=1, 2, 4. The parameter N is pre-configured or configured by the network. FIG. 8 is a schematic diagram showing the case when N=4.

Here, the time slot interval between the PSFCH and its corresponding PSSCH is at least 2 time slots, and therefore the feedback information of the PSSCHs transmitted in time slots 2, 3, 4, and 5 is all transmitted in time slot 7. The time slot {2, 3, 4, 5} can be regarded as a time slot set, and the PSFCHs corresponding to the PSSCHs transmitted in the time slot set are in the same time slot.

The resource allocation method according to the present disclosure will be described below with reference to the accompanying drawings.

FIG. 9 is a schematic flowchart illustrating a resource allocation method provided by the present disclosure.

At S901, a terminal device obtains first configuration information, the first configuration information being used for configuring sidelink communication resources.

The terminal device determines the sidelink communication resources according to the first configuration information.

As a non-limiting example, the first configuration information may be pre-configured, or may be configuration information from a network device or from another terminal device.

For example, the first configuration information may be information preconfigured in the terminal device, and when the terminal device needs to perform sidelink communication, the terminal device may obtain the first configuration information from the preconfigured information. The present disclosure is not limited to this.

In another example, the first configuration information may be from a network device or from another terminal device. For example, Terminal Device A receives the first configuration information from a network device or Terminal Device B, and determines the sidelink communication resources according to the first configuration information. The present disclosure is not limited to this.

It should be noted that the first configuration information may include one or more pieces of information (for example, the first configuration information may include the following first indication information, second indication information, etc., but the present disclosure is not limited to this).

In an implementation, the terminal device obtaining the first configuration information may be understood as obtaining all information in the first configuration information at one time.

For example, the terminal device may obtain all information for configuring the sidelink communication resources from the pre-configured information at one time, or the terminal device may receive a configuration message (such as a Radio Resource Control (RRC) message) which includes all information in the first configuration information.

In another implementation, the terminal device obtaining the first configuration information may be understood as the terminal device obtaining different information in the first configuration information separately.

For example, in order for the terminal device to determine the sidelink communication resources, the terminal device may first obtain first indication information in the first configuration information from the pre-configured information, and then obtain second indication information or other indication information in the first configuration information. Alternatively, multiple pieces of information in the first configuration information may be carried in multiple configuration messages, and the terminal device may receive the multiple configuration messages separately to obtain different information in the first configuration information. The present disclosure is not limited to this. It should be understood that when the terminal device obtains the information in the first configuration information separately, the present disclosure is not limited to any order in which the terminal device obtains different information in the first configuration information.

Optionally, the first configuration information being used for configuring the sidelink communication resources may include the first configuration information being used for configuring a sidelink communication resource pool. The resource pool includes at least one resource allocation unit.

In an embodiment of the present disclosure, the resource pool is the sidelink communication resources as an example for illustration. It should be understood that the present disclosure is not limited to this, and the resource pool in the embodiment of the present disclosure can be replaced by the sidelink communication resources. The resource pool may also be referred to as a resource set or a time-frequency resource set, and the present disclosure is not limited to this.

In some implementations, the resource pool may include K1 Resource Block (RB) sets and one resource block set may include K2 resource blocks, where K1 and K2 are positive integers. In some implementations, one resource block set may correspond to one channel in an unlicensed spectrum (or shared spectrum) or a minimum frequency domain granularity for LBT.

For example, a bandwidth corresponding to a channel on the unlicensed spectrum is 20 MHz, that is, a bandwidth corresponding to a resource block set is also 20 MHz. Alternatively, the bandwidth of a channel on the unlicensed spectrum is 20 MHz, corresponding to K3 RBs, and the K3 RBs are all RBs included in one channel or all RBs available for data transmission in one channel, such as K3=100 (corresponding to 15 kHz subcarrier spacing). Then one resource block set also corresponds to 100 RBs, that is, K2=100.

In another example, on the unlicensed spectrum, it is required to determine whether the unlicensed spectrum can be used based on a result of LBT. The minimum frequency domain granularity for LBT is 20 MHz, and one resource block set corresponds to a number of RBs included in 20 MHz, or a resource block set includes K2=100 RBs (corresponding to 15 kHz subcarrier spacing). The minimum frequency domain granularity for LBT is one resource block set, that is, 100 RBs.

In some embodiments, a frequency domain starting position of the resource pool may be same as a frequency domain starting position of a first resource block set in the K1 resource block sets (RB sets), the first resource block set being a resource block set with a lowest frequency domain position among the K1 RB sets.

In some embodiments, a frequency domain ending position of the resource pool may be same as a frequency domain ending position of a second resource block set in the K1 RB sets, the second resource block set being a resource block set with a highest frequency domain position among the K1 RB sets.

For example, the resource pool includes K1=3 RB sets, and the indexes of the corresponding RB sets are Resource Block Set 0, Resource Block Set 1 and Resource Block Set 2, respectively. Here the frequency domain position of Resource Block Set 0 is the lowest, and the frequency domain position of Resource Block Set 2 is the highest. Therefore, the frequency domain starting position of the resource pool is the same as the frequency domain starting position of Resource Block Set 0, or the frequency domain starting position of the resource pool is determined according to the frequency domain starting position of Resource Block Set 0. The frequency domain ending position of the resource pool is the same as the frequency domain ending position of Resource Block Set 2, or the frequency domain ending position of the resource pool is determined according to the frequency domain ending position of Resource Block Set 2.

In some implementations, there may be a Guard Band (GB) between two adjacent RB sets among the K1 RB sets included in the resource pool.

In some implementations, a frequency domain starting position of the guard band and a frequency domain size of the guard band may be determined according to pre-configuration information or network configuration information. The terminal obtains the pre-configuration information or network configuration information, and the pre-configuration information or network configuration information may be used to configure the Guard Band (GB). In a possible implementation, the frequency domain resource of the guard band is determined according to the following two parameters:

$$GB_s^{start,\mu} \text{ and } GB_s^{size,\mu}, \text{ where } GB_s^{start,\mu}$$

is used to determine the frequency domain starting position of the guard band, $$GB_s^{size,\mu}$$

is used to determine the frequency domain resource size of the guard band (for example, it can be expressed as the number of RBs), s represents an index value (such as the index of the guard band in a sidelink carrier or sidelink BWP), and μ is determined according to the size of the sidelink subcarrier spacing.

In some embodiments, the guard band may be used to separate RB sets, and one resource block set includes K2 RBs. The frequency domain resources of one resource block set are determined according to the parameters $$RB_s^{start,\mu} \text{ and } RB_s^{end,\mu},$$

where s represents the index value and $$RB_s^{start,\mu}$$

indicates the frequency domain starting position the s-th resource block set, $$RB_s^{end,\mu}$$

indicates the frequency domain ending position of the s-th resource block set, and μ is determined according to the sidelink subcarrier spacing. For the s-th resource block set, the number of RBs included therein is $$RB_s^{size,\mu} = RB_s^{end,\mu} - RB_s^{start,\mu} + 1.$$

In some embodiments, the terminal device can determine the frequency domain starting position and the frequency domain ending position of the s-th resource block set according to e.g., the following Equation (1):

$$RB_s^{start,\mu} = N_{grid}^{start,\mu} + \begin{cases} 0 & s = 0 \\ GB_{s-1}^{start,\mu} + GB_{s-1}^{size,\mu} & \text{otherwise} \end{cases} \quad \text{Equation (1)}$$

$$RB_s^{end,\mu} = N_{grid}^{start,\mu} + \begin{cases} N_{grid}^{size,\mu} - 1 & s = N_{RB\,set} - 1 \\ GB_s^{start,\mu} - 1 & \text{otherwise} \end{cases}$$

Here, $$N_{grid}^{start,\mu}$$

represents the frequency domain starting position corresponding to the sidelink carrier (or sidelink BWP or resource pool), and in some implementations, $$N_{grid}^{start,\mu} = 0;$$

$$N_{grid}^{size,\mu}$$

represents the frequency domain resource size corresponding to the sidelink carrier (or sidelink BWP or resource pool), expressed as the number of RBs; and $N_{RB\,set}$ represents the number of RB sets included in the sidelink carrier (or sidelink BWP or resource pool).

Figure 10:
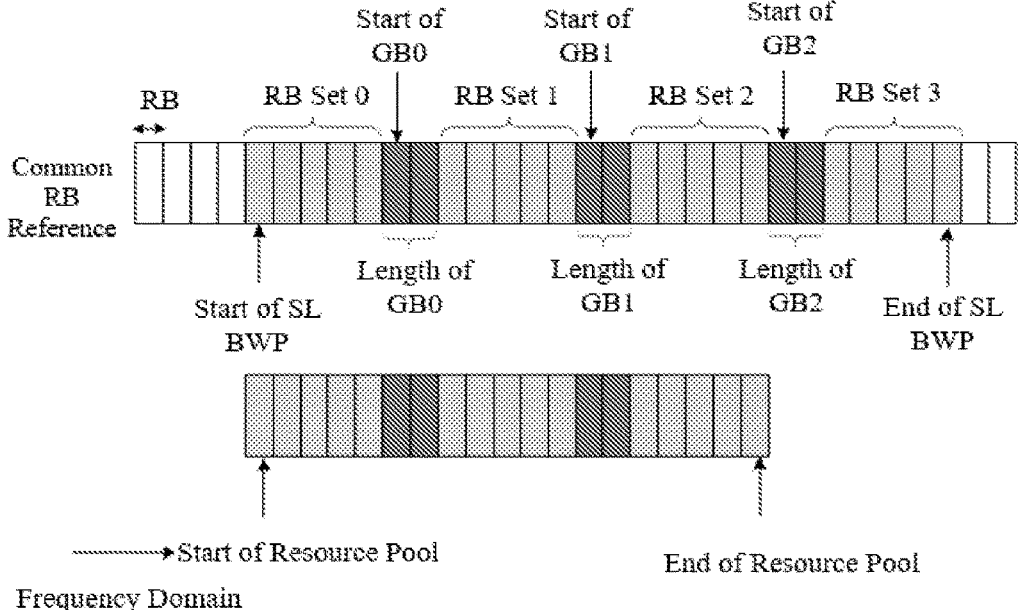
FIG. 10 is a schematic diagram showing determining of a frequency domain starting position and end position of a resource block set according to an embodiment of the present disclosure.

For example, it can be understood with reference to FIG. 10. As shown in FIG. 10: 3 guard bands are configured in the sidelink BWP, corresponding to GB 0, GB 1, and GB 2, respectively, and these 3 guard bands separate 4 resource block set. According to the frequency domain starting position of the sidelink BWP (that is, the start point of the sidelink BWP shown in the figure) and the frequency domain starting position of each guard band (that is, the start point of the guard band shown in the figure) and the frequency domain size of the guard band (that is, the length of the guard band shown in the figure), the frequency domain starting position and end position of each resource block set can be determined. Since the resource pool includes three RB sets, that is, Resource Block Set 0 to Resource Block Set 2, the frequency domain starting position of the resource pool (that is, the start point of the resource pool shown in the figure) corresponds to the frequency domain starting position of Resource Block Set 0, and the frequency domain ending position of the resource pool (that is, the end point of the resource pool shown in the figure) corresponds to the frequency domain ending position of Resource Block Set 2.

In some embodiments, the sidelink BWP includes K4 RB sets, and the frequency domain starting position of the sidelink BWP is the same as the frequency domain starting position of the third resource block set in the K4 RB sets, and the frequency domain ending position of the sidelink BWP is the same as the frequency domain ending position of the fourth resource block set in the K4 RB sets. Here the third resource block set is the resource block set with the lowest frequency domain position among the K4 RB sets, and the fourth resource block set is the resource block set with the highest frequency domain position among the K4 RB sets.

Optionally, the configuration information includes fourth indication information indicating a Bandwidth Part (BWP) where the resource pool is located.

In commercial scenarios such as smart home and communication between wearable devices and mobile phones, etc., there is a high demand for energy saving of terminal devices. In order to reduce the power consumption of the terminal device, narrow bandwidth data transmission is a way to reduce power consumption.

In SL communication, it can be specified that the terminal device can support one or more BWPs. Here, different BWPs may correspond to different bandwidths, and/or different BWPs may correspond to different numerologies.

For example, the numerology may include subcarrier spacing, and different BWPs may have different subcarrier spacing, but the present disclosure is not limited to this. For a low-capability terminal device, or a terminal device having a high demand for energy saving, it can work in a narrow-band, and the fourth indication information in the first configuration information can indicate a BWP with a small bandwidth (for example, a BWP with a bandwidth smaller than or equal to a preset threshold, but present disclosure is not limited to this), that is, the bandwidth of the BWP where the resource pool is located is relatively small. For a high-capability terminal, or a terminal with a high demand for transmission rate, it can work in a wide bandwidth, and the fourth indication information in the first configuration information may indicate a BWP with a large bandwidth (for example, a BWP with a bandwidth greater than or equal to a preset threshold, but the present disclosure is not limited to this).

As a non-limiting example, the fourth indication information may include identification information of the BWP.

For example, the first configuration information may include index information (that is, an example of identification information) of the BWP, indicating that the resource pool is a resource in the BWP corresponding to the BWP index information. The present disclosure is not limited to this.

Figure 11:
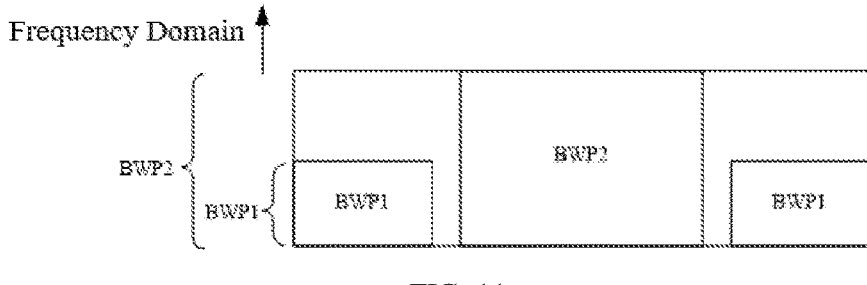
FIG. 11 is a schematic diagram showing various BWPs according to an embodiment of the present disclosure.

As shown in FIG. 11, two BWPs are configured in the system: BWP1 and BWP2. BWP1 is a narrowband BWP, and BWP2 is a broadband BWP. The fourth indication information includes index information of BWP1, which means that the resource pool is a resource pool in BWP1. The present disclosure is not limited to this.

At S902, the terminal device obtains a structure of a resource allocation unit according to the first configuration information.

The resource allocation unit may include a plurality of resource units, and the terminal device may obtain the structure used for the resource allocation unit in the resource pool according to the first configuration information.

As a non-limiting example, the resource unit may be a PRB, and one PRB includes one time slot in the time domain and a plurality of subcarriers in the frequency domain.

Here, the resource allocation unit may include at least one structure, and the at least one structure includes a first structure, which is a structure where the plurality of resource units included in the resource allocation unit are non-contiguous in a frequency domain.

For example, one resource allocation unit may include a plurality of PRBs, and there is at least one resource block between two adjacent resource blocks in the frequency domain among the plurality of resource blocks. The resource allocation unit having the first structure may be referred to as an Interlace RB (IRB).

Figure 12:
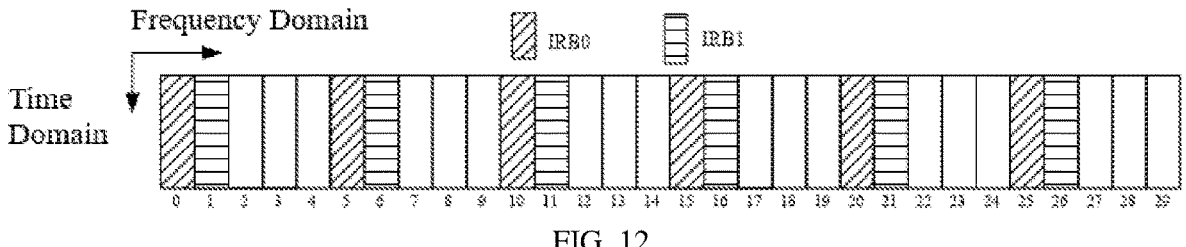
FIG. 12 is a schematic diagram showing a first frequency domain structure of a resource allocation unit according to an embodiment of the present disclosure.

For example, FIG. 12 is a schematic diagram showing a structure of an IRB. The bandwidth includes 30 PRBs, i.e., RB0 to RB29. In the first structure, frequency domain resource allocation is performed in units of IRBs. Here, one IRB includes 6 PRBs, and there are 5 PRBs between every two adjacent PRBs. As shown in FIG. 12, IRB0 includes PRB0, PRB5, PRB10, PRB15, PRB20, and PRB25. There are 5 PRBs between two adjacent PRBs, such as PRB0 and PRB5. IRB0 and IRB1 are two different resource allocation units, respectively. In sidelink communication, one or more IRBs in the resource pool may be scheduled for communication in units of IRBs. The present disclosure is not limited to this.

The plurality of structures of the resource allocation unit may further include a second structure, which is a structure where the plurality of resource units included in the resource allocation unit are consecutive in the frequency domain.

For example, in the second structure, one resource allocation unit may include one or more PRBs, and the one or more resource blocks are consecutive in the frequency domain.

For example, the resource allocation unit having the second structure may be one PRB, and one or more PRBs in the resource pool may be scheduled for communication in units of one PRB in sidelink communication. Alternatively, the resource allocation unit having the second structure may be N consecutive PRBs in the frequency domain, where N is a positive integer greater than 1. In the sidelink communication, the N PRBs can be used as a unit (that is, N PRBs are an RB Group (RBG) or a sub-channel), and in the sidelink communication, one or more RBGs in the resource pool can be scheduled for communication. The present disclosure is not limited to this.

Optionally, the first configuration information may include first indication information indicating the structure of the resource allocation unit in the resource pool as the first structure or the second structure.

Optionally, when the first indication information indicates that the resource allocation unit has the first structure, the first configuration information may further include indication information indicating a frequency domain interval between two resource units in one resource allocation unit.

For example, the first configuration information may further include indication information indicating a frequency domain interval between two adjacent PRBs in one IRB. The indication information indicating the frequency domain interval may indicate the number of PRBs between two adjacent PRBs in the IRB. For the IRB structure shown in FIG. 12, the indication information indicating the frequency domain interval may indicate that the frequency domain interval is 5 PRB. The terminal device may determine that there are 5 PRBs between two adjacent PRBs in the IRB according to the indication information indicating the frequency domain interval. The present disclosure is not limited to this.

Optionally, the indication information indicating the frequency domain interval may indicate the number of PRBs between two adjacent PRBs in the IRB. If the frequency domain interval between two adjacent PRBs is greater than 1 (that is, there is at least one resource block between two adjacent resource blocks), it indicates that the resource allocation unit has the first structure; or if the frequency domain interval between two adjacent PRBs is equal to 1 (that is, there are consecutive resource blocks in the frequency domain between adjacent two resource blocks), it indicates that the resource allocation unit has the second structure.

The terminal device can determine the structure of the resource allocation unit according to the indication information indicating the frequency domain interval.

The first configuration information may further include fifth indication information indicating frequency domain resources included in the resource pool. The terminal device may determine the frequency domain resources included in the resource pool according to the fifth indication information. The fifth indication information may indicate at least one of: a frequency domain starting position of the sidelink communication resources, a frequency domain resource length of the sidelink communication resources, identification information of the resource allocation unit included in the sidelink communication resources, or a frequency domain ending position of the sidelink communication resources.

In the following example, the resource allocation unit is an IRB (that is, the structure of the resource allocation unit is the first structure) as an example. When the structure of the resource allocation unit is the second structure, similar implementations can be adopted, and details thereof will be omitted for the sake of brevity.

When the resource allocation unit is an IRB, the schemes for the fifth indication information to indicate the frequency domain resources included in the resource pool may include but not limited to the following schemes:

Scheme 1: The fifth indication information indicates the frequency domain starting position and the frequency domain resource length of the resource pool.

As a non-limiting example, the fifth indication information includes identification information of a start PRB and a number of PRBs included in the resource pool.

Figure 13:
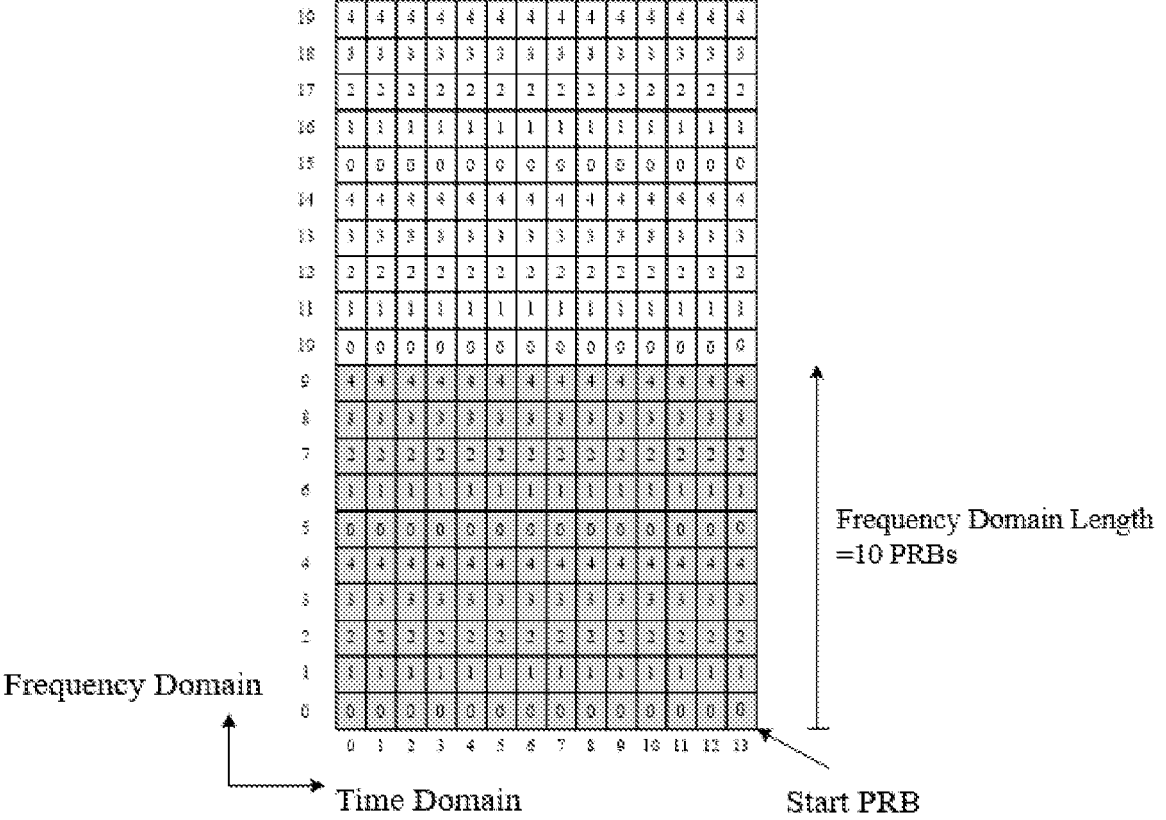
FIG. 13 is a schematic diagram showing frequency domain resources in a resource pool according to an embodiment of the present disclosure.

For example, as shown in FIG. 13, the system frequency domain resources include 20 PRBs, i.e., PRB0 to PRB19, including 5 IRBs in total, i.e., IRB0 to IRB4, and each IRB includes 4 RBs. The number in each box in the figure indicates the IRB to which the resource belongs. For example, IRB0 includes PRB0, PRB5, PRB10, and PRB15. The fifth indication information may indicate a start RB index 0, and the frequency domain resource length of 10 PRBs. According to the fifth indication information, the terminal device can determine that the range of frequency domain resources included in the resource pool is PRB0 to PRB9. Specifically, the resource pool includes the first two PRBs of each IRB in IRB0 to IRB4. For example, the resource pool includes PRB0 and PRB5 in IRB0, PRB1 and PRB6 in IRB1, PRB2 and PRB7 in IRB2, PRB3 and PRB8 in IRB3, and PRB4 and PRB9 in IRB4. The application is not limited to this.

Scheme 2: The fifth indication information indicates the resource allocation units included in the resource pool.

As a non-limiting example, the fifth indication information includes identification information of the resource allocation units included in the resource pool. Alternatively, the fifth indication information includes identification information of a start resource allocation unit included in the resource pool and a number of consecutive resource allocation units.

Figure 14:
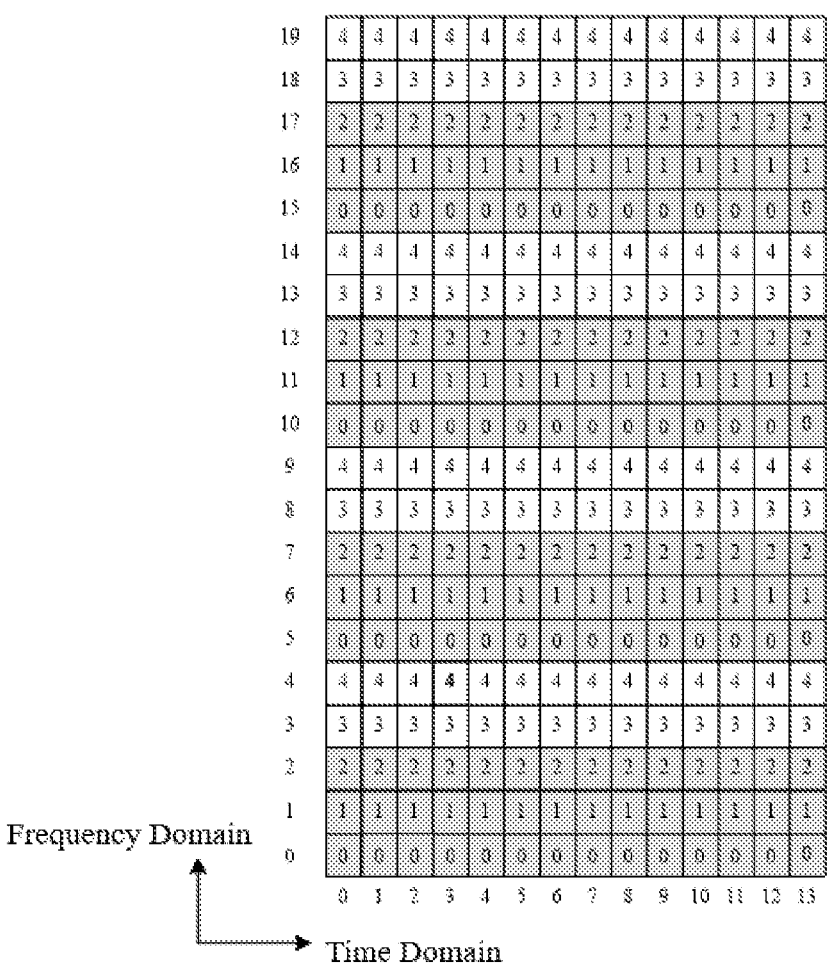
FIG. 14 is another schematic diagram showing frequency domain resources in a resource pool according to an embodiment of the present disclosure.

For example, as shown in FIG. 14, the system frequency domain resources include 20 PRBs, i.e., PRB0 to PRB19, including 5 IRBs in total, i.e., IRB0 to IRB4, each IRB includes 4 PRBs, and the resource pool includes IRB0, IRB1, and IRB2. The fifth indication information may indicate Index 0 of IRB0, Index 1 of IRB1, and Index 2 of IRB2, or the fifth indication information may indicate Index 0 of the start IRB0 and the number 3 of the consecutive IRBs included in the resource pool. According to the fifth indication information, the terminal device may determine that the resource pool includes IRB0, IRB1, and IRB2. The present disclosure is not limited to this.

Scheme 3: The fifth indication information indicates the frequency domain starting position of the resource pool, the identification information of the resource allocation units included in the resource pool, and the frequency domain ending position of the resource pool.

As a non-limiting example, the fifth indication information includes identification information of the start PRB in the resource pool, the identification information of the resource allocation units included in the resource pool, and the identification information of the end PRB in the resource pool.

Figure 15:
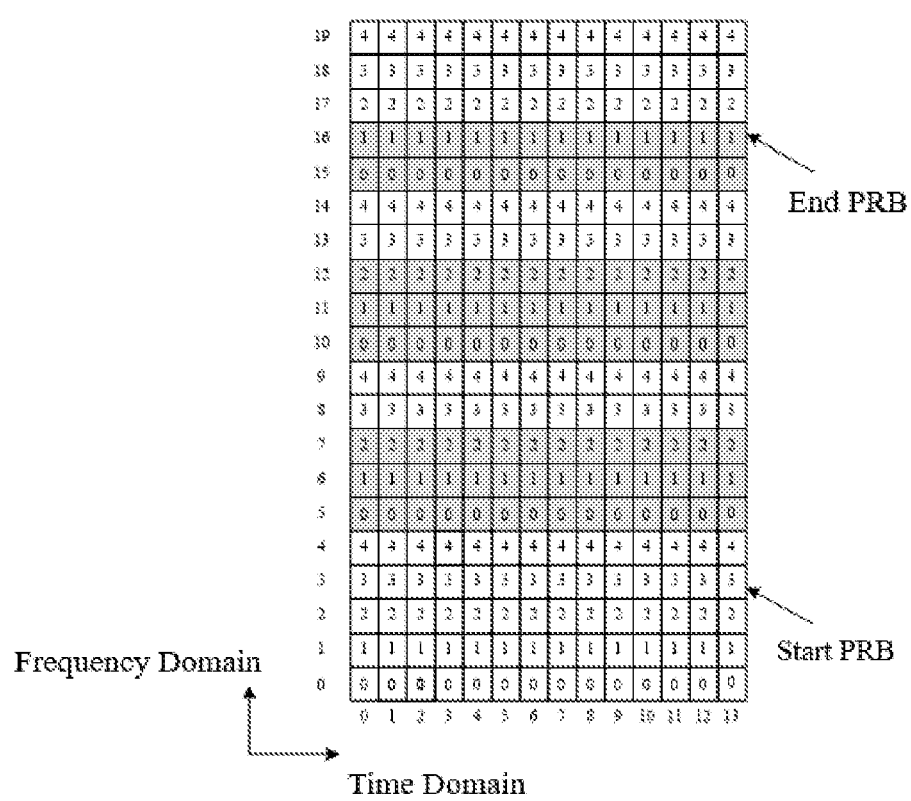
FIG. 15 is another schematic diagram showing frequency domain resources in a resource pool according to an embodiment of the present disclosure.

For example, as shown in FIG. 15, the system frequency domain resources include 20 PRBs, i.e., PRB0 to PRB19, including 5 IRBs in total, i.e., IRB0 to IRB4, each IRB includes 4 PRBs, and the resource pool includes PRBs between PRB3 and PRB16 in IRB0, IRB1, and IRB2. The fifth indication information may indicate Index 3 of the start PRB3, Index 16 of the end PRB16, and Indexes 0, 1, and 2 of the IRBs. According to the fifth indication information, the terminal device may determine that the resource pool includes the PRBs located between PRB3 to PRB16 and belonging to IRB0, IRB1, and IRB2. That is, as shown in FIG. 15, the resource pool includes PRB5, PRB10 and PRB15 in IRB0, PRB6, PRB11 and PRB16 in IRB1, and PRB7 and PRB12 in IRB2. The present disclosure is not limited to this.

Scheme 4: The frequency domain starting position and frequency domain resource length of the resource pool, and the identification information of the resource allocation units included in the resource pool.

As a non-limiting example, the fifth indication information includes identification information of the start PRB in the resource pool, the number of RBs included in the frequency domain resource, and identification information of the resource allocation units.

Figure 16:
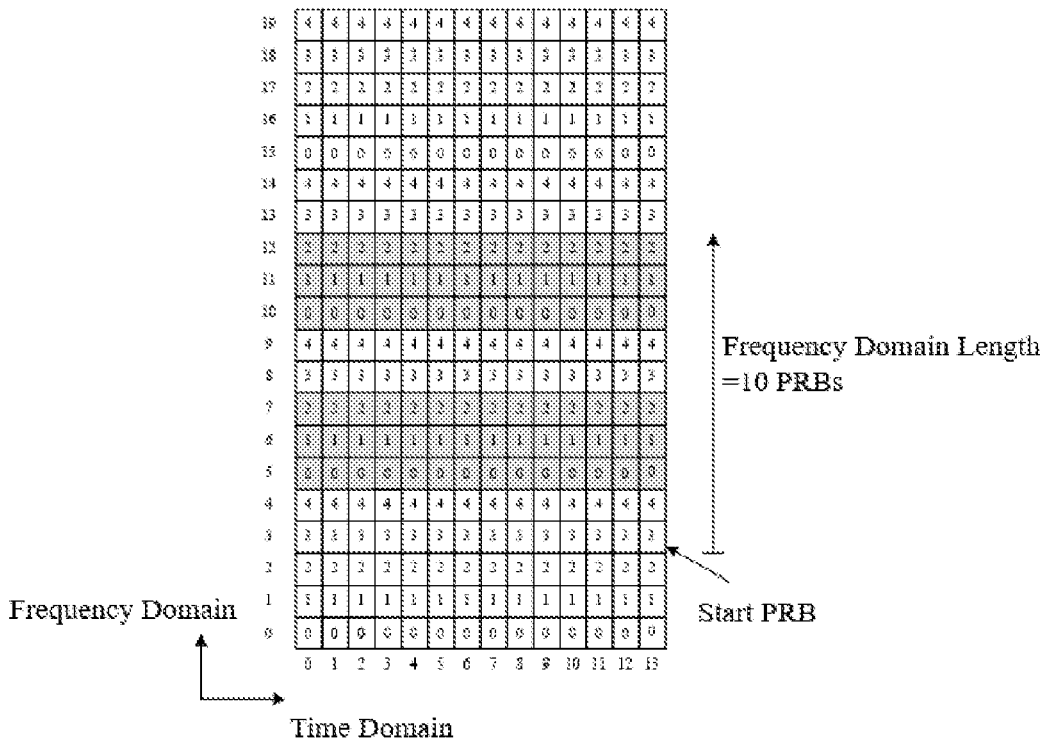
FIG. 16 is another schematic diagram showing frequency domain resources in a resource pool according to an embodiment of the present disclosure.

For example, as shown in FIG. 16, the system frequency domain resources include 20 PRBs, i.e., PRB0 to PRB19, including 5 IRBs in total, i.e., IRB0 to IRB4, each IRB includes 4 PRBs, and the resource pool includes PRBs among 10 consecutive PRBs starting with PRB3 that belong to IRB0, IRB1, and IRB2. The fifth indication information includes Index 3 of PRB3, the number 10 of consecutive PRBs, and IRB Indexes 0, 1, and 2. According to the fifth indication information, the terminal device may determine that the resource pool includes PRBs among 10 consecutive PRBs starting with RB3 that belong to IRB0, IRB1 and IRB2. That is, as shown in the figure, the resource pool includes PRB5 and PRB10 in IRB0, PRB6 and PRB11 in IRB1, and PRB7 and PRB12 in IRB2. The present disclosure is not limited to this.

In some implementations, the first configuration information in this embodiment may include eleventh indication information indicating a frequency domain resource allocation granularity of a PSSCH, the frequency domain resource allocation granularity including one or more resource allocation units.

In some embodiments, a frequency domain resource occupied by the PSCCH may be smaller than or equal to the frequency domain resource allocation granularity of the PSSCH channel, the PSCCH being used to schedule the PSSCH.

Specifically, in the NR SL, the resource allocation granularity of the PSSCH is subchannel, that is, the second structure as described above. The PSCCH occupies 2 or 3 OFDM in the time domain, and may occupy {10, 12 15, 20, 25} PRBs in the frequency domain. It can be seen that the total number of resources included in the resources of the PSCCH is 2 (OFDM symbols)*10 (PRB)*12 (subcarriers) at the minimum, and 3 (OFDM symbols)*25 (PRB)*12 (subcarriers) at the maximum.

When using the IRB structure, that is, the above first structure, for the sidelink subcarrier spacing of 15 kHz or 30 kHz, the number of PRBs included in one IRB resource is not less than 10, but usually, the number of PRBs included in one IRB resource is 10 or 11. If one IRB is still used as the minimum allocation granularity of the PSSCH, the maximum number of resources occupied by the PSCCH is 3 (OFDM symbol)*11 (PRB)*12 (subcarriers), which is much smaller than the maximum number of resources of the PSCCH in NR SL. This will in turn increase the code rate of the PSCCH and degrade the PSCCH detection performance.

To solve the above problem, in this embodiment, the first configuration information includes the eleventh indication information, which indicates the frequency domain resource granularity of the PSSCH.

In some embodiments, the eleventh indication information indicates that the frequency domain resource of one PSSCH includes at least Q IRBs; or the eleventh indication information indicates that the frequency domain resource granularity of the PSSCH is Q IRBs; where Q is an integer greater than or equal to 1.

In some embodiments, the frequency domain resource of the PSCCH used to schedule the PSSCH is smaller than or equal to the frequency domain resource granularity of the PSSCH.

For example, the resource pool configuration information may include eleventh indication information, which indicates that the frequency domain resource granularity of the PSSCH is 2 IRBs, i.e., Q=2. Each IRB includes 10 PRBs, then the frequency domain resource of the PSCCH can be 1 or 2 IRBs, or the frequency domain resource of the PSCCH is less than or equal to 20 PRBs.

At S930, the terminal device allocates one or more resource allocation units for sidelink communication.

The terminal device transmits a PSCCH and a PSSCH using the allocated one or more resource allocation units, the PSCCH being used to schedule the PSSCH.

Optionally, the PSCCH and the PSSCH may be transmitted in the allocated one or more resource allocation units using at least one of: a Time Division Multiplexing (TDM) mode, a Frequency Division Multiplexing (FDM) mode, or a TDM+FDM mode.

When the TDM mode is used, the resource for transmitting the PSCCH and the resource for transmitting the PSSCH overlap in a frequency domain but do not overlap in a time domain.

When the FDM mode is used, the resource for transmitting the PSCCH and the resource for transmitting the PSSCH do not overlap in the frequency domain but overlap in the time domain.

When the TDM+FDM mode is used, the resource for transmitting the PSCCH and the resource for transmitting the PSSCH partially overlap in the frequency domain and partially overlap in the time domain.

Taking the resource allocation unit as an IRB (that is, the structure of the resource allocation unit is the first structure) as an example, the TDM mode, the FDM mode or the TDM+FDM mode between the PSSCH and the PSCCH will be respectively introduced below.

In one embodiment, the PSCCH and the PSSCH are transmitted using the TDM mode.

One of the allocated one or more resource allocation units may include n second time units in at least one first time unit in the time domain, the n second time units being used for transmitting the PSCCH and the PSSCH.

The PSCCH and the PSSCH being transmitted using the TDM mode may include: the PSCCH being transmitted using N of the n second time units, and the PSSCH being transmitted using the other second time units than the N second time units in the n second time units, where N and n are positive integers, and 1≤N≤n. As a non-limiting example, the first time unit may be a time slot, and the second time unit may be a symbol (or time domain symbol or OFDM symbol).

Optionally, positions of the N second time units among the n second time units may be specified in a protocol, preconfigured by a system, or configured by the first configuration information.

Figure 17:
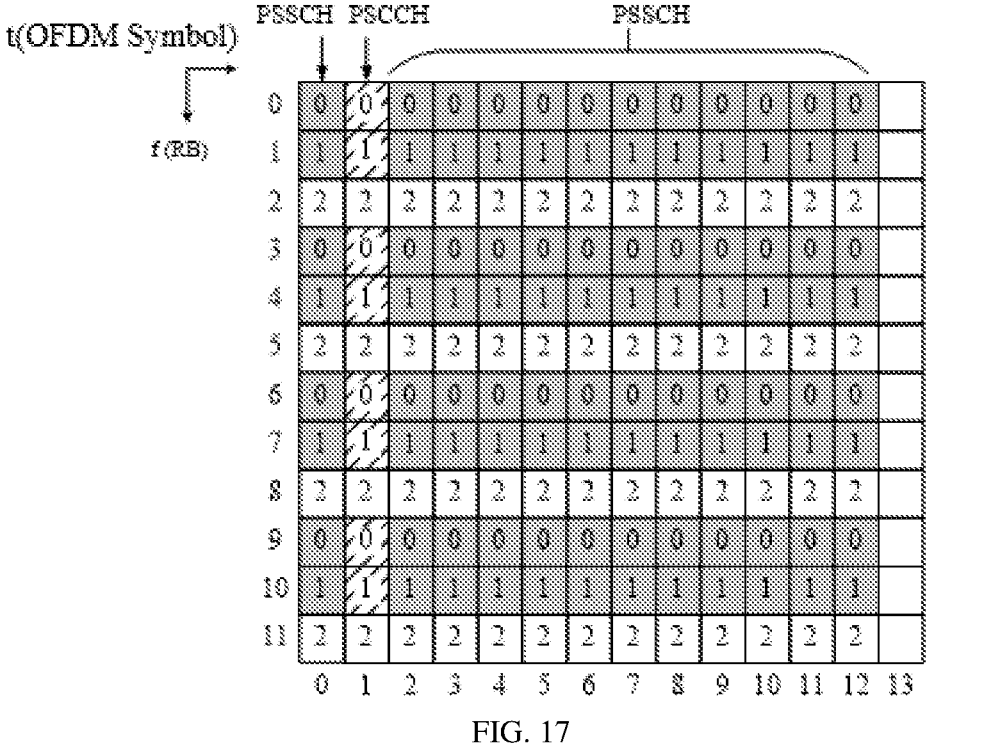
FIG. 17 is a schematic diagram showing a first multiplexing mode of a PSCCH and a PSSCH according to an embodiment of the present disclosure.

For example, as shown in FIG. 17, the resource allocation unit is an IRB, and one IRB includes 13 symbols in a time slot in the time domain (that is, OFDM Symbol 0 to OFDM Symbol 12, n=13). The terminal device allocates two resource allocation units, IRB0 and IRB1, for sidelink resources. The resources for transmitting the PSCCH use the second OFDM symbol in the scheduled IRB0 and IRB1 (that is, OFDM symbol 1 in a slot, N=1), and the PSSCH is transmitted using symbols other than OFDM Symbol 1 in IRB0 and IRB1. OFDM Symbol 13 in the time slot is a GP symbol. The present disclosure is not limited to this.

It should be noted that the above example is explained with reference to the case where the second OFDM symbol in the scheduled IRB0 and IRB1 is used as the resources for transmitting the PSCCH, but the present disclosure is not limited to this. The resources for transmitting the PSCCH may use the second OFDM symbol, or the third OFDM symbol, or the second and third OFDM symbols, or the first and second OFDM symbols, or the first to the third OFDM symbols (that is, the first, second and third OFDM symbols), or one or more OFDM symbols in the allocated one or more resource allocation units, and the present disclosure is not limited to this.

In another implementation, the PSCCH and the PSSCH may be transmitted using the FDM mode.

One of the allocated one or more resource allocation units may include m frequency units in the frequency domain.

The PSCCH and the PSSCH being transmitted using the FDM mode may include: the allocated one or more resource allocation units including a first resource allocation unit, the PSCCH being transmitted using M frequency units in the first resource allocation unit, and the PSSCH being transmitted using the other frequency units than the M frequency units in the one or more resource allocation units, where M and m are positive integers, and 1≤M≤m.

As a non-limiting example, the frequency unit is the frequency domain range of one PRB, that is, the frequency unit is a plurality of subcarriers included in one PRB.

For example, as shown in FIG. 18, the resource allocation unit is an IRB, and one IRB includes 5 frequency units in the frequency domain (that is, m=5), and the interval between two adjacent frequency units in the frequency domain in one IRB is 3 frequency units. The terminal device allocates two resource allocation units, IRB0 and IRB1, as sidelink resources. The PSCCH is transmitted using the first frequency unit and the second frequency unit in IRB0 (that is, M=2). The PSSCH is transmitted using frequency units other than those used for the PDCCH in IRB0 and IRB1. The present disclosure is not limited to this.

In another implementation, the PSCCH and the PSSCH may be transmitted using the TDM+FDM mode.

One of the allocated one or more resource allocation units may include n second time units in at least one first time unit in the time domain and m frequency units in the frequency domain; and the n second time units are for transmitting the PSCCH and the PSSCH.

The PSCCH and the PSSCH being transmitted using the TDM+FDM mode may include: the one or more resource allocation units including a first resource allocation unit, the PSCCH being transmitted using N of the n second time units in the time domain and M frequency units in the first resource allocation unit in the frequency domain; and the PSSCH being transmitted using the other resource than the resource for transmitting the PSCCH in the one or more resource allocation units, where M and m are positive integers, and 1≤N≤n, 1≤M<m.

For example, as shown in FIG. 19, the resource allocation unit is an IRB, and one IRB includes 13 symbols in a time slot in the time domain (that is, OFDM Symbol 0 to OFDM Symbol 12, n=13), and one IRB includes 4 frequency units in the frequency domain (that is, m=5), and the interval between two adjacent frequency units in the frequency domain in one IRB is 3 frequency units. The terminal device allocates two resource allocation units, IRB0 and IRB1, as sidelink resources. The resources for transmitting the PSCCH include OFDM Symbol 1 and OFDM Symbol 2 in IRB0 in the time domain, and each frequency unit in IRB0 in the frequency domain (i.e., M=4). The PSSCH is transmitted using resources other than those used for the PDCCH in IRB0 and IRB1. The present disclosure is not limited to this. In another example, as shown in FIG. 20, the first symbol in one time slot is an AGC symbol, and the last symbol is a GP symbol. PSCCH1 is used to schedule PSSCH1, and PSCCH2 is used to schedule PSSCH2. The resources used for transmitting PSCCH1 include OFDM Symbol 1 and OFDM Symbol 2 in IRB0 in the time domain and each frequency unit in IRB0 in the frequency domain (that is, M=4). The PSSCH is transmitted using resources other than those used for the PDCCH in IRB0 and IRB1. The resources used for transmitting PSCCH2 include OFDM symbol 1 and OFDM symbol 2 in IRB2 in the time domain, and each frequency unit in IRB2 in the frequency domain (that is, M=4). The PSSCH is transmitted using resources other than those used for the PDCCH in IRB2. The present disclosure is not limited to this.

In an implementation, the configuration information may include second indication information indicating a multiplexing mode for transmitting the PSCCH and the PSSCH.

For example, the second indication information may indicate identification information of the TDM mode, the FDM mode, or the TDM+FDM mode, and the terminal device may determine the multiplexing mode for the PSCCH and the PSSCH allocated for the terminal device as the multiplexing mode corresponding to the identification information according to the identification information of the multiplexing mode indicated in the second indication information. The present disclosure is not limited to this.

In another implementation, the terminal device may determine the multiplexing mode for the PSCCH and the PSSCH according to the number of second time units for transmitting the PSCCH and/or according to the number of frequency units for transmitting the PSCCH.

Optionally, the first configuration information may include third indication information indicating the number of second time units included in the resource for transmitting the PSCCH and/or indicating the number of frequency units included in the resource for transmitting the PSCCH.

In an example, the terminal device may determine the multiplexing mode used by the PSCCH and the PSSCH according to the number of second time units for transmitting the PSCCH. For example, when the first configuration information indicates that the PSCCH is transmitted using N OFDM symbols (where N is a positive integer and is smaller than the number of time-domain symbols available for sidelink transmission in the time slot), it means the PSCCH and the PSSCH are transmitted using the TDM mode or TDM+FDM mode. When the number of OFDM symbols for transmitting the PSCCH is equal to the number of OFDM symbols available for sidelink transmission in the time slot, it means that the PSCCH and the PSSCH are transmitted using the FDM mode. The present disclosure is not limited to this.

In a specific example, one time slot includes 14 time domain symbols, and all time domain symbols in this time slot can be used for sidelink transmission (including GP symbols). Here, the PSCCH occupies N OFDM symbols, and when N=14, it means that the PSCCH and the PSSCH are in the FDM mode, and when N<14, it means that the PSCCH and the PSSCH are in the TDM mode or TDM+FDM mode.

In another example, the second time unit may be an OFDM symbol, and the first configuration information may include Indication Information 1 (that is, an example of the third indication information), which indicates the number of OFDM symbols for transmitting the PSCCH. The terminal device may determine the multiplexing mode of the PSCCH and the PSSCH according to Indication Information 1. The present disclosure is not limited to this.

In another example, the terminal device may determine the multiplexing mode for transmitting the PSCCH and the PSSCH according to the number of PRBs, IRBs or sub-channels for transmitting the PSCCH. For example, when the number of PRBs for transmitting the PSCCH is equal to the number of PRBs included in the IRB, or equal to the number of PRBs included in the sub-channel, it means that the PSCCH and the PSSCH are transmitted using the TDM mode or the TDM+FDM mode. When the number of RBs for transmitting the PSCCH is smaller than the number of RBs included in the IRB, or smaller than the number of RB s included in the sub-channel, it means that the PSCCH and the PSSCH are transmitted using the FDM mode or the TDM+FDM mode. The present disclosure is not limited to this. In another example, the first configuration information may further include Indication Information 2 (that is, another example of the third indication information), which indicates the number of RBs, IRBs or sub-channels occupied by the PSCCH in the resource pool. The terminal device may determine the multiplexing mode of the PSCCH and the PSSCH according to Indication Information 2, and the present disclosure is not limited to this.

In the resource configuration method provided in an embodiment of the present disclosure, the terminal device may obtain second configuration information, which is used for configuring a transmission parameter for the PSFCH (the second configuration information may be referred to as PSFCH configuration information). The terminal device can determine the transmission parameter of the PSFCH in the sidelink communication resources according to the PSFCH configuration information, e.g., the transmission parameter of the PSFCH in the resource pool for sidelink communication.

As a non-limiting example, the second configuration information may be pre-configured, from a network device, or from another terminal device.

In an implementation, the second configuration information may be included in the foregoing first configuration information, and the terminal device acquires the second configuration information included in the first configuration information after acquiring the first configuration information.

In another implementation, the terminal device may obtain the second configuration information separately. The second configuration information may include one or more types of information (such as the following PSFCH format indication information, sixth indication information, seventh indication information, etc., but present disclosure is not limited thereto), and the terminal device can obtain all information in the second configuration information at one time, or obtain multiple pieces of information in the second configuration information separately. For specific implementations, reference may be made to the above description of the obtaining of the first configuration information by the terminal device, and for the sake of brevity, details thereof will be omitted here.

Optionally, the PSFCH may include a plurality of formats, two of which are different with regard to at least one of:

the number of frequency units included in the resource for transmitting the PSFCH, the number of second time units included in the resource for transmitting the PSFCH, or a maximum number of bits carried by the PSFCH.

For example, the PSFCH may include but not limited to the following three formats:

Format 0: The PSFCH carries 1-bit HARQ-ACK information, and occupies 2 time-domain symbols in the time domain and a frequency unit of 1 PRB in the frequency domain.

Format 1: The PSFCH occupies all time-domain symbols available for sidelink transmission in one time slot (for example, the time-domain symbols available for sidelink transmission, not including the last GP symbol), and occupies frequency units of A1 PRBs in the frequency domain, and thus can carry a maximum of M1 bits of sidelink feedback information, where A1 is an integer greater than or equal to 1.

Figures 21, 22:
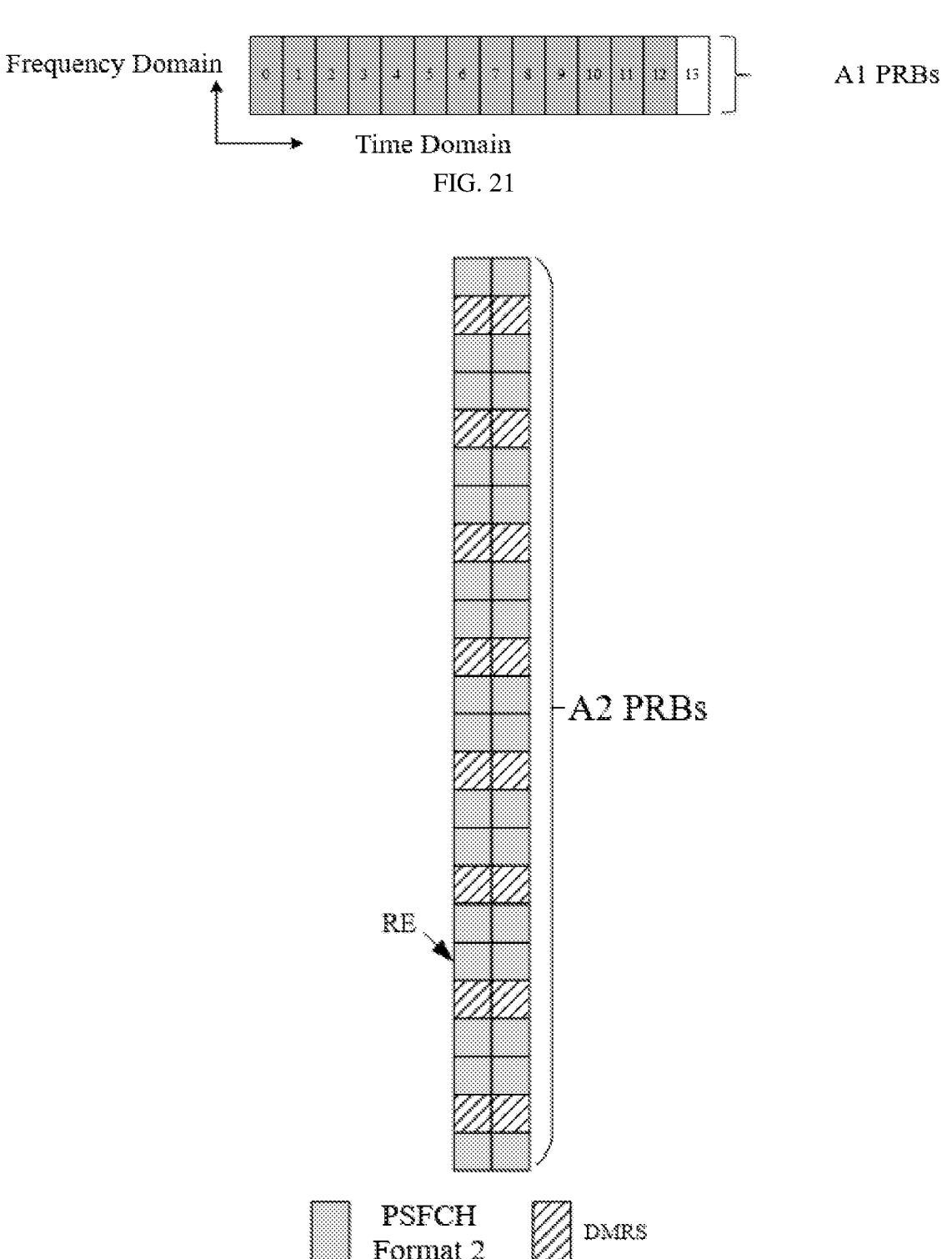
FIG. 21 is a schematic diagram showing PSFCH Format 1 according to an embodiment of the present disclosure.
FIG. 22 is a schematic diagram showing PSFCH Format 2 according to an embodiment of the present disclosure.

For example, PSFCH Format 1 is shown in FIG. 21, but the present disclosure is not limited thereto.

Format 2: The PSFCH occupies 2 OFDM symbols in the time domain and frequency units of A2 PRBs in the frequency domain, and can carry up to M2 bits of sidelink feedback information, where A2 is an integer greater than 1.

For example, PSFCH Format 2 is shown in FIG. 22. The resource used for transmitting the PSFCH occupies 2 OFDM symbols in the time domain, and the Resource Elements (REs) used for transmitting the PSFCH and the REs used for transmitting the DMRS are frequency division multiplexed on the 2 symbols. The REs used for transmitting the PSFCH and the REs used for transmitting the DMRS are different REs in the A2 PRBs in the 2 OFDM symbols. The present disclosure is not limited to this.

Optionally, the PSFCH configuration information may further include PSFCH format indication information indicating at least one PSFCH format supported by the resource pool.

For example, the PSFCH format indication information may indicate at least one of Formats 0, 1, and 2 above. The present disclosure is not limited to this.

Optionally, the configuration information of the PSFCH may further include sixth indication information and/or seventh indication information, the sixth indication information indicating that a time domain cycle of the PSFCH in the resource pool, and the seventh indication information indicating a time offset of the first first time unit for transmitting the PSFCH relative to a first time domain position. The first first time unit for transmitting the PSFCH is the the first first time unit for transmitting the PSFCH within one cycle of System Frame Number (SFN) or one cycle of Direct Frame Number (DFN).

The first time domain position is one of:

a starting position or ending position of the first first time unit in one SFN cycle;

a starting position or ending position of the first first time unit in one DFN cycle;

a starting position or ending position of the first candidate first time unit for transmitting the PSSCH in the resource pool in one SFN cycle; or a starting position or the ending position of the first candidate time slot for transmitting the PSSCH in the resource pool in one DFN cycle.

The terminal device may determine the first time unit including the PSFCH in the resource pool according to the sixth indication information and/or the seventh indication information.

As a non-limiting example, the sixth indication information may specifically indicate the number p of the first time units included in one time domain cycle of the PSFCH. According to the sixth indication information, the terminal device may determine the transmission resource including the PSFCH in every p first time units.

For example, the first time unit is a time slot, and the configuration information of the PSFCH may further include the sixth indication information and the seventh indication information. The terminal device can determine one time slot for transmitting the PSFCH according to the time offset indicated by the seventh indication information. Then, according to the cycle indicated by the sixth indication information, the terminal device can determine each time slot in the resource pool for transmitting the PSFCH. The present disclosure is not limited to this.

Optionally, the configuration information of the PSFCH may further include eighth indication information indicating the number of second time units included in the resource for transmitting the PSFCH.

The terminal device can determine the number of second time units included in the resources for transmitting the PSFCH in one time slot according to the eighth indication information.

Optionally, the terminal device may determine a format of the PSFCH according to the number of second time units occupied by the PSFCH.

For example, when only PSFCH Format 0 and Format 1 are supported in the system, the terminal device may determine the format of the PSFCH supported by the resource pool according to the number of second time units included in the resources used for transmitting the PSFCH. If the PSFCH second time unit indication information indicates that the resources used for transmitting the PSFCH include 2 second time units, it means that the resource pool supports PSFCH Format 0. Alternatively, if the PSFCH second time unit indication information indicates that the resources used for transmitting the PSFCH include more than 2 second time units, it means that the resource pool supports PSFCH Format 1. The present disclosure is not limited to this.

Optionally, the configuration information of the PSFCH may further include PSFCH frequency domain resource indication information indicating a frequency domain resource for transmitting the PSFCH.

In one embodiment, the PSFCH frequency domain resource indication information may be a bitmap including a plurality of bits corresponding to a plurality of resource allocation units in the resource pool. One bit in the bitmap indicates whether the corresponding resource allocation unit includes a frequency domain resource for transmitting the PSFCH. Here, the resource allocation unit may be an IRB.

For example, as shown in FIG. 12, the frequency domain resources of the system (or the frequency domain resources in the resource pool) include frequency units of 5 IRBs, and the bitmap of the PSFCH frequency domain resource indication information includes 5 bits, each corresponding to one IRB. Here, a bit value of 1 means that the IRB corresponding to the bit can be for transmitting the PSFCH, and a value of 0 means that the IRB corresponding to the bit cannot be for transmitting the PSFCH. For example, if the 5 bits of the bitmap are 11000, it means that the IRB0 and IRB1 resources can be used for transmitting the PSFCH. The present disclosure is not limited to this.

In another implementation, the PSFCH frequency domain resource indication information (that is, the ninth indication information) may indicate a PSFCH resource set.

Optionally, the ninth indication information may include identification information of a start PRB of the PSFCH resource set and frequency domain resource length information of the PSFCH resource set.

Figures 23, 24, 25:
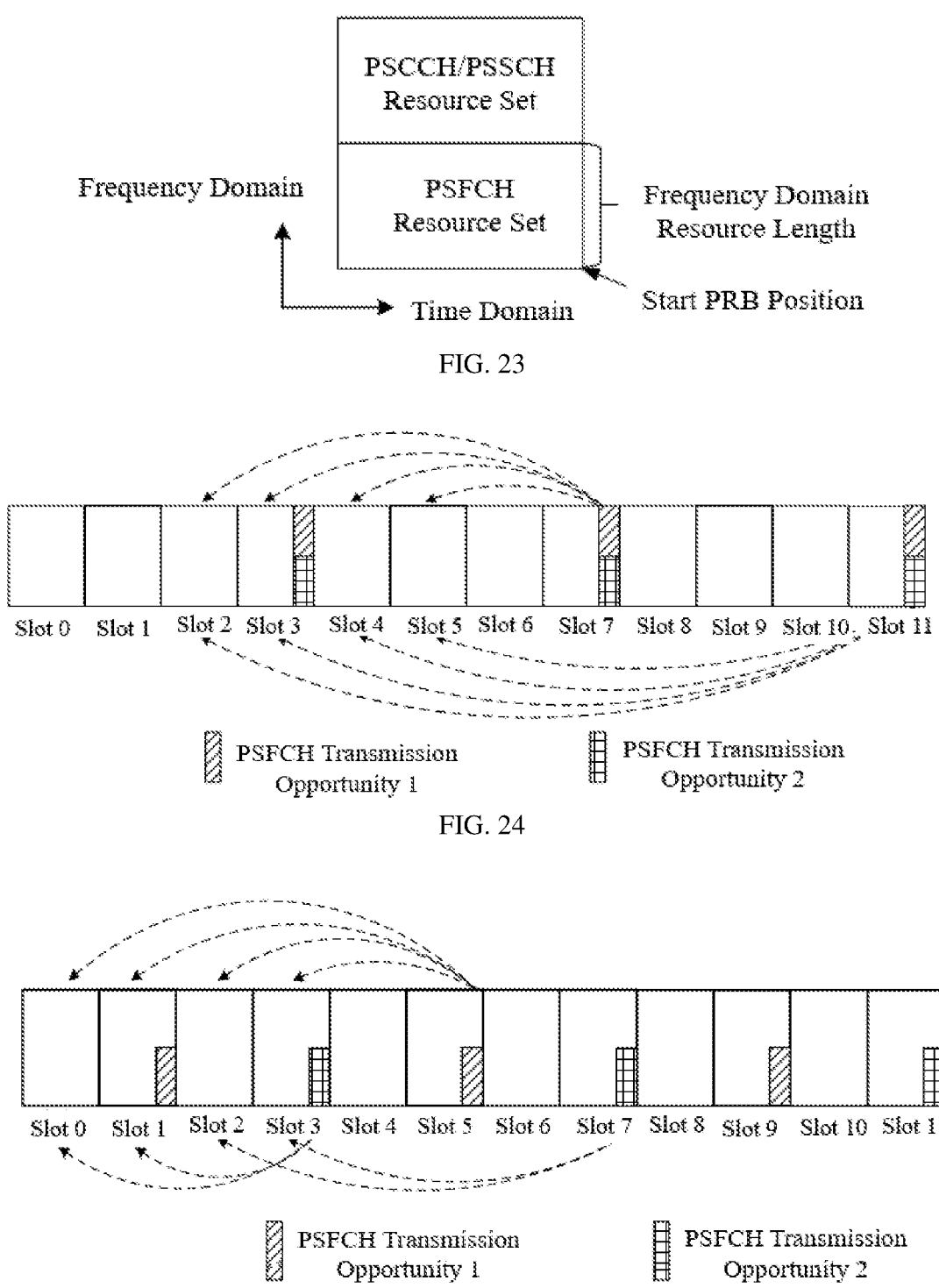
FIG. 23 is a schematic diagram showing a PSFCH resource set according to an embodiment of the present disclosure.
FIG. 24 is a schematic diagram showing multiple PSFCH transmission opportunities according to an embodiment of the present disclosure.
FIG. 25 is another schematic diagram showing multiple PSFCH transmission opportunities according to an embodiment of the present disclosure.

For example, as shown in FIG. 23, for PSFCH Format 1 above, since each PSFCH occupies all the time domain symbols available for sidelink transmission in a time slot, the PSFCH resource set and a PSSCH/PSCCH resource set can be frequency-division multiplexed. The terminal device may determine the PSFCH resource set according to the ninth indication information, but the present disclosure is not limited thereto.

In an example, the ninth indication information may indicate the frequency domain resource length of the PSFCH resource set by indicating the number of PRBs included in the frequency domain resources of the PSFCH resource set.

In another example, the ninth indication information may indicate the frequency domain resource length of the PSFCH resource set by indicating the number of PSFCHs that do not overlap in the frequency domain among the frequency domain resources in the PSFCH resource set.

For example, the resources for transmitting the PSFCH in the resource pool may include A1 PRBs, and the ninth indication information may indicate that the frequency domain resources of the PSFCH resource set may include a number q of PSFCHs that do not overlap in the frequency domain, then the length of the PSFCH resource set is q*A1 RBs. The present disclosure is not limited to this.

Optionally, the terminal device may obtain tenth indication information indicating that a number X of PSFCH transmission opportunities corresponding to one PSSCH in the resource pool, where X is a positive integer. Here, the number X of the PSFCH transmission opportunities represents X PSFCH transmission opportunities for the same PSSCH. Optionally, the X PSFCH transmission opportunities represent X PSFCH transmission opportunities in the time domain.

The terminal device may determine the X PSFCH transmission opportunities corresponding to one PSSCH transmission resource according to the tenth indication information. That is, the feedback information of the terminal device for the PSSCH may be carried in at least one of the X PSFCH transmission opportunities.

When the sidelink communication is in the unlicensed frequency band, the terminal device needs to perform a Listen Before Talk (LBT) operation before the sidelink transmission. Only when the LBT is successful can the transmission be performed, otherwise the sidelink transmission cannot be performed. If the PSFCH of only one time slot corresponds to the PSSCH, and the receiver fails in LBT before the PSFCH, it cannot transmit the feedback information corresponding to the PSSCH, which will cause the transmitter to retransmit the PSSCH even if the receiver has received the PSSCH correctly, resulting in a waste of resources. Therefore, according to an embodiment of the present disclosure, the tenth indication information may indicate a plurality of PSFCH transmission opportunities, such that when the terminal device acts as a receiver, even if the LBT fails before one PSFCH, it still has the opportunity to transmit the PSFCH.

For example, as shown in FIG. 24, the cycle of the PSFCH may be 4 time slots, the minimum time interval between the PSFCH and the PSSCH may be 2 time slots, and the tenth indication information may indicate that the number of PSFCH transmission opportunities is 2, including Transmission Opportunity 1 and Transmission Opportunity 2. In the example shown in FIG. 24, there is an interval of one PSFCH cycle (that is, 4 time slots) between two transmission opportunities corresponding to the same PSSCH, but the present disclosure is not limited to this. The interval between two transmission opportunities corresponding to the same PSSCH may be more than one PSFCH cycle. As shown in FIG. 24, the first PSFCH transmission opportunity corresponding to the PSSCH carried in time slots 2, 3, 4, and 5 is PSFCH Transmission Opportunity 1 in time slot 7, and the second transmission opportunity is PSFCH Transmission opportunity 2 in time slot 11. Similarly, the correspondence between the PSFCH transmission opportunities in other cycles and the PSSCH can be obtained. If the terminal device receives the PSSCH in time slot 2, the first transmission opportunity corresponding to the PSSCH is PSFCH Transmission Opportunity 1 in time slot 7, and the second transmission opportunity is PSFCH Transmission Opportunity 2 in time slot 11. If the terminal device successfully performs the LBT before Transmission Opportunity 1 in time slot 7, it transmits the PSFCH in the time slot 7, and the PSFCH carries the feedback information for the PSSCH in time slot 2. If the terminal device fails in LBT before Transmission Opportunity 1 in time slot 7, the terminal device cannot transmit the PSFCH in time slot 7, and the terminal device can perform LBT before Transmission Opportunity 2 in time slot 11. If the terminal device succeeds in LBT before Transmission Opportunity 2 in time slot 11, the terminal can transmit PSFCH in time slot 11, and the PSFCH carries the feedback information for the PSSCH in time slot 2. The present disclosure is not limited to this.

Optionally, the tenth indication information may be included in the first configuration information, and the first configuration information may include configuration information of X PSFCHs corresponding to the X transmission opportunities. Here, the configuration information of each PSFCH in the configuration information of the X PSFCHs may include at least one of:

the sixth indication information, the seventh indication information, the information indicating the number of time domain symbols occupied by the PSFCH, or the information indicating the frequency domain resource of the PSFCH.

Optionally, at least two transmission opportunities among the X transmission opportunities do not overlap in the time domain, and/or at least two PSFCH transmission opportunities corresponding to the same PSSCH do not overlap in the time domain.

For example, as shown in FIG. 24, the system configures 2 PSFCH transmission opportunities corresponding to each PSSCH. The first transmission opportunity of the PSFCH corresponding to the PSSCH carried in time slots 2, 3, 4, and 5 is PSFCH Transmission Opportunity 1 in time slot 7, and the second transmission opportunity is PSFCH Transmission Opportunity 2 in time slot 11.

In another example as shown in FIG. 25, the system configures 2 PSFCH transmission opportunities corresponding to each PSSCH, that is, PSFCH Transmission Opportunity 1 and PSFCH Transmission Opportunity 2. For example, the minimum slot interval between the PSSCH and the PSFCH corresponding to the PSSCH can be configured as 2 time slots, then for the PSSCH, the time slot where the first PSFCH transmission opportunity corresponding to the PSSCH is located is the first time slot after the time slot where the PSSCH is located that includes the PSFCH transmission resource and satisfies the minimum slot interval (that is, at least 2 time slots spacing from the time slot where the PSSCH is located), and the time slot where the second PSFCH transmission opportunity corresponding to the PSSCH is located is the second time slot after the time slot where the PSSCH is located that includes the PSFCH transmission resource and satisfies the minimum slot interval (that is, at least 2 time slots spacing from the time slot where the PSSCH is located).

As shown in FIG. 25, the minimum slot interval between the PSSCH and the PSFCH corresponding to the PSSCH is 2 time slots, then the first transmission opportunity of the PSFCH corresponding to the PSSCH carried in time slot 0 is the first time slot after time slot 0 that includes the PSFCH transmission resource and is separated from time slot 0 by at least 2 time slots, i.e., time slot 3, and the second transmission opportunity is the second time slot after time slot 0 that includes the PSFCH transmission resource and is separated from time slot 0 by at least 2 time slots, i.e., time slot 5. In the same way, the terminal device can also determine that the first transmission opportunity of the PSFCH corresponding to the PSSCH carried in time slot 1 is in time slot 3, and the second transmission opportunity is in time slot 5; the first transmission opportunity of the PSFCH corresponding to the PSSCH carried in time slot 2 is in time slot 5, and the second transmission opportunity is in time slot 7; the first transmission opportunity of the PSFCH corresponding to the PSSCH carried in time slot 3 is in time slot 5, and the second transmission opportunity is in time slot 7. The present disclosure is not limited to this.

According to the solutions of the present disclosure, the terminal device can determine the resource pool for sidelink communication according to the first configuration information. The first configuration information not only configures the resource pool for sidelink communication on the licensed frequency spectrum, but also configures the resource pool for sidelink communication on the unlicensed spectrum that satisfies the regulatory requirements on the unlicensed spectrum, so as to provide a solution of sidelink communication using the unlicensed spectrum, which can improve the flexibility of resource allocation.

As above, the methods according to the embodiments of the present disclosure have been described in detail with reference to FIG. 9 to FIG. 25. The apparatuses according to the embodiments of the present disclosure will be introduced below.

Figure 26:
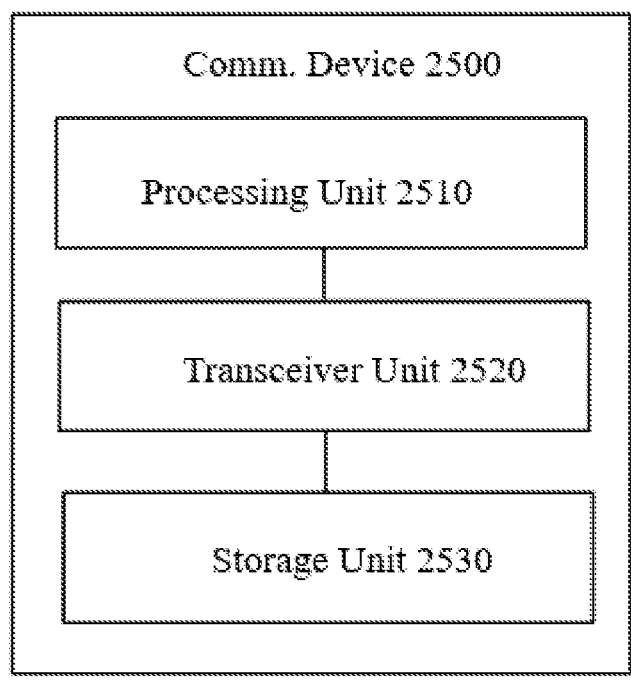
FIG. 26 is a schematic block diagram of a communication device according to an embodiment of the present disclosure.

FIG. 26 is a schematic block diagram of a communication device according to an embodiment of the present disclosure. As shown in FIG. 26, the communication device 2500 may include a processing unit 2510 and a transceiver unit 2520.

In a possible design, the communication device 2500 may correspond to the terminal device, i.e., the UE, or the chip configured in (or used in) the terminal device in the above method embodiments.

It should be understood that the communication device 2500 may correspond to the terminal device in the method 900 of the embodiment of the present disclosure, and the communication device 2500 may include units for performing the method performed by the terminal device in the method 900 in FIG. 9. Moreover, the respective units in the communication device 2500 and the other operations and/or functions described above are intended to implement the corresponding flow of the method 900 in FIG. 9.

Optionally, when the communication device 2500 corresponds to the terminal device in the method 900 of the embodiment of the present disclosure, the communication device 2500 may further include an obtaining unit, and the obtaining unit may be configured to obtain the first configuration information configured in the terminal device. Alternatively, the first configuration information may be received by the transceiver unit 2510 from the network device.

It should also be understood that when the communication device 2500 is a chip configured in (or used in) a terminal device, the transceiver unit 2520 in the communication device 2500 may be an input/output interface or circuit of the chip, and the processing unit 2510 in the communication device 2500 may be a processor in a chip.

Optionally, the processing unit 2510 of the communication device 2500 may be configured to process instructions or data to implement corresponding operations.

Optionally, the communication device 2500 may further include a storage unit 2530, which may be configured to store instructions or data, and the processing unit 2510 may execute the instructions or data stored in the storage unit 2530, such that the communication device can implement the corresponding operations. The transceiver unit 2520 in the communication device 2500 may correspond to the transceiver 2610 in the terminal device 2600 shown in FIG. 27, and the storage unit 2530 may correspond to the memory in the terminal device 2600 shown in FIG. 27.

It should be understood that the specific processes for the respective units to perform the above corresponding steps have been described in detail in the above method embodiments, and for the sake of brevity, details thereof will be omitted here.

It should also be understood that when the communication device 2500 is a terminal device, the transceiver unit 2520 in the communication device 2500 can be implemented as a communication interface (such as a transceiver or an input/output interface). For example, it can correspond to the transceiver 2610 in the terminal device 2600 shown in FIG. 27. The processing unit 2510 in the communication device 2500 may be implemented by at least one processor. For example, it can correspond to the processor 2620 in the terminal device 2600 shown in FIG. 27. The processing unit 2510 in the communication device 2500 may be implemented by at least one logic circuit.

In another possible design, the communication device 2500 may correspond to the network device or, for example, a chip configured (or used) in the network device in the above method embodiments.

It should be understood that the communication device 2500 may correspond to the network device in the method 900 according to the embodiment of the present disclosure, and the communication device 2500 may include units for performing the method performed by the network device in the method 900 in FIG. 9. Moreover, the respective units in the communication device 2500 and the other operations and/or functions described above are intended to implement the corresponding flow of the method 900 in FIG. 9.

It should also be understood that when the communication device 2500 is a chip configured (or used) in a network device, the transceiver unit 2520 in the communication device 2500 may be an input/output interface or circuit in the chip, and the processing unit 2510 in the communication device 2500 may be a processor in a chip.

Optionally, the processing unit 2510 of the communication device 2500 may be configured to process instructions or data to implement corresponding operations.

Optionally, the communication device 2500 may further include a storage unit 2530, which may be configured to store instructions or data, and the processing unit may execute the instructions or data stored in the storage unit 2530, such that the communication device can implement the corresponding operations. The storage unit 2530 in the communication device 2500 may correspond to the memory in the network device 2700 shown in FIG. 28.

It should be understood that the specific processes for the respective units to perform the above corresponding steps have been described in detail in the above method embodiments, and for the sake of brevity, details thereof will be omitted here.

Figure 28:
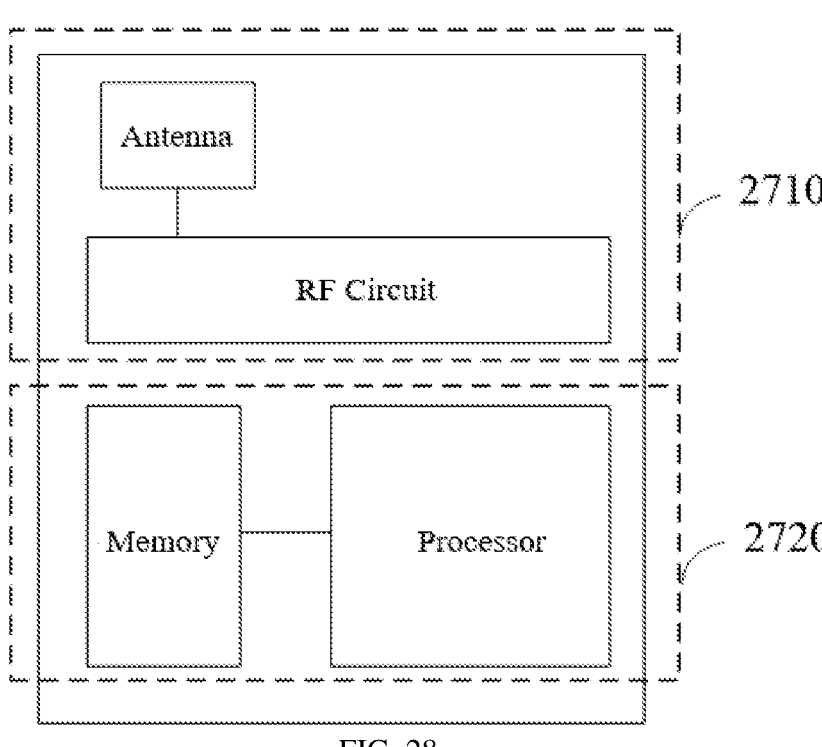
FIG. 28 is a schematic diagram showing a structure of a network device according to an embodiment of the present disclosure.

It should also be understood that when the communication device 2500 is a network device, the transceiver unit 2520 in the communication device 2500 can be implemented as a communication interface (such as a transceiver or an input/output interface), For example, it can correspond to the transceiver 2710 in the network device 2700 shown in FIG. 28. The processing unit 2510 in the communication device 2500 may be implemented by at least one processor. For example, it can correspond to the processor 2720 in the network device 2700 shown in FIG. 28. The processing unit 2510 in the communication device 2500 may be implemented by at least one logic circuit.

Figure 27:
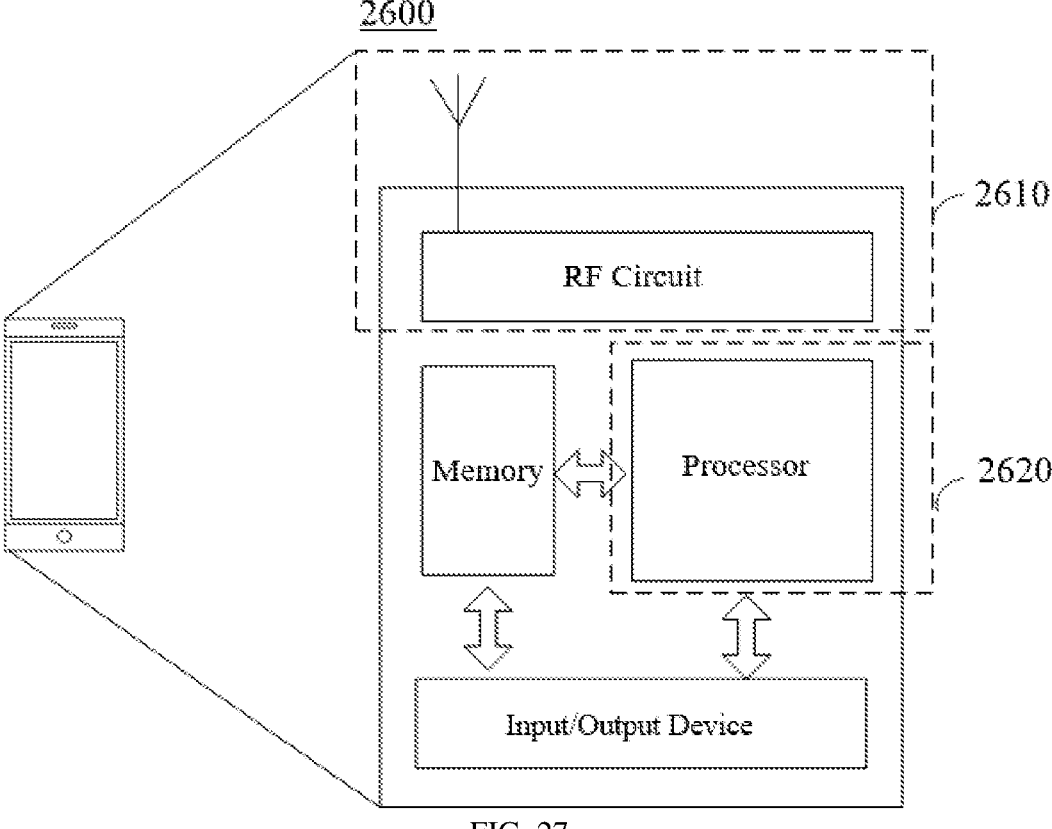
FIG. 27 is a schematic diagram showing a structure of a terminal device according to an embodiment of the present disclosure.

FIG. 27 is a schematic diagram showing a structure of a terminal device 2600 according to an embodiment of the present disclosure. The terminal device 2600 may be applied in the system shown in FIG. 1 to perform functions of the terminal device in the above method embodiments. As shown in the figure, the terminal device 2600 includes a processor 2620 and a transceiver 2610. Optionally, the terminal device 2600 may further include a memory. Here, the processor 2620, the transceiver 2610, and the memory can communicate with each other through an internal connection path to transmit control and/or data signals. The memory is configured to store a computer program, and the processor 2620 is configured to execute the computer program in the memory, to control the transceiver 2610 to transmit and receive signals.

The processor 2620 and the memory may be combined into a processing device, and the processor 2620 may be configured to execute the program codes stored in the memory to implement the above functions. In a specific implementation, the memory may be integrated in the processor 2620, or may be independent of the processor 2620. The processor 2620 may correspond to the processing unit in FIG. 26.

The above transceiver 2610 may correspond to the transceiver unit 2520 in FIG. 26. The transceiver 2610 may include a receiver (or receiver or receiving circuit) and a transmitter (or a transmitter or transmitting circuit). Here, the receiver is configured to receive signals, and the transmitter is configured to transmit signals.

It should be understood that the terminal device 2600 shown in FIG. 27 can implement the respective processes involving the first terminal device or the second terminal device in the embodiment of the method 900 in FIG. 9. The operations and/or functions of the respective modules in the terminal device 2600 are provided for implementing the corresponding processes in the above method embodiments. For details, reference may be made to the descriptions in the above method embodiments, and description thereof will be omitted here as appropriate.

The above processor 2620 can be configured to execute the actions implemented at the terminal device as described in the above method embodiments, and the transceiver 2610 can be configured to execute the actions of the terminal device transmitting to the network device or receiving from the network device as described in the above method embodiments. For details, reference can be made to the description in the above method embodiments, and description thereof will be omitted here.

Optionally, the terminal device 2600 may further include a power supply configured to provide power to the respective devices or circuits in the terminal device.

In addition, in order to make the functions of the terminal device more complete, the terminal device 2600 may further include one or more of an input unit, a display unit, an audio circuit, a camera, and a sensor. The audio circuit may include a speaker, a microphone, etc.

FIG. 28 is a schematic diagram showing a structure of a network device according to an embodiment of the present disclosure. The network device 2700 can be applied in the system shown in FIG. 1 to perform the functions of the network device in the above method embodiments. As shown in the figure, the terminal device 2700 includes a processor 2720 and a transceiver 2710. Optionally, the network device 2700 may further include a memory. Here, the processor 2720, the transceiver 2710, and the memory can communicate with each other through an internal connection path to transmit control and/or data signals. The memory is configured to store a computer program, and the processor 2620 is configured to execute the computer program in the memory, to control the transceiver 2610 to transmit and receive signals.

It should be understood that the network device 2700 shown in FIG. 28 can implement the respective processes involving the network device in the method 900 in FIG. 9. The operations and/or functions of the respective modules in the network device 2700 are provided for implementing the corresponding processes in the above method embodiments. For details, reference may be made to the descriptions in the above method embodiments, and description thereof will be omitted here as appropriate.

It should be understood that the network device 2700 shown in FIG. 28 is only a possible architecture of the network device, and should not constitute any limitation to the present disclosure. The methods according to the present disclosure can be applied in network devices of other architectures, e.g., network devices including CUs, DUs, and AAUs. The present disclosure is not limited to any specific architecture of the network device.

The embodiment of the present disclosure also provides a processing device, including a processor and an interface. The processor is configured to perform the method in any one of the above method embodiments.

It should be understood that the above processing device may be one or more chips. For example, the processing device may be a Field Programmable Gate Array (FPGA), an Application Specific Integrated Circuit (ASIC), a System on Chip (SoC), a Central Processor Unit (CPU), a Network Processor (NP), a Digital Signal Processor (DSP), a Micro Controller Unit (MCU), a Programmable Logic Device (PLD) or other integrated chips.

In the implementation process, each step of the above method can be completed by an integrated logic circuit of hardware in a processor or an instruction in the form of software. The steps of the methods disclosed in connection with the embodiments of the present disclosure may be directly implemented by a hardware processor, or implemented by a combination of hardware in the processor and software modules. The software modules can be provided in a storage medium known in the related art, such as random access memory, flash memory, read-only memory, programmable read-only memory or electrically erasable programmable memory, or register. The storage medium is provided in the memory, and the processor reads information from the memory, and completes the steps of the above methods in combination with its hardware. Detailed description will be omitted here for brevity.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

According to the methods provided in the embodiments of the present disclosure, the present disclosure also provides a computer program product. The computer program product includes computer program codes which, when executed by one or more processors, cause an apparatus including the processor(s) to perform the method in any of the above embodiments.

According to the methods provided in the embodiments of the present disclosure, the present disclosure also provides a computer-readable storage medium. The computer-readable storage medium stores program codes which, when executed by one or more processors, cause an apparatus including the processor(s) to perform the method in any of the above embodiments.

According to the methods provided in the embodiments of the present disclosure, the present disclosure further provides a system, which includes one or more network devices described above. The system may further include one or more terminal devices as described above.

In the embodiments of the present disclosure, it can be appreciated that the disclosed devices and methods may be implemented in other ways. For example, the device embodiments described above are illustrative only. For example, the divisions of the modules are only divisions based on logical functions, and there may be other divisions in actual implementations. For example, more than one module may be combined or integrated into another system, or some features can be ignored or omitted. In addition, the mutual coupling or direct coupling or communicative connection as shown or discussed may be indirect coupling or communicative connection between modules via some interfaces which may be electrical, mechanical, or in any other forms.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A resource allocation method, applied in a terminal device, the method comprising:
    obtaining pre-configured first configuration information or obtaining first configuration information from a network device or from another terminal device, the first configuration information being used for configuring sidelink communication resources;
    obtaining pre-configured second configuration information or obtaining second configuration information from a network device or from another terminal device, the second configuration information being used for configuring a transmission parameter for a Physical Sidelink Feedback Channel (PSFCH) in the sidelink communication resources, the second configuration information comprising indication information indicating at least one of: at least one PSFCH format used for the PSFCH, a frequency domain resource for transmitting the PSFCH, a time domain resource for transmitting the PSFCH, a first time unit where the PSFCH is located, or the resource allocation unit where the PSFCH is located, wherein the first time unit comprises at least one second time unit;
    obtaining tenth indication information indicating a number X of PSFCH transmission opportunities corresponding to one Physical Sidelink Shared Channel (PSSCH) in the sidelink communication resources, where X is a positive integer;
    obtaining a structure of a resource allocation unit according to the first configuration information; and
    allocating one or more resource allocation units for sidelink communication of the terminal device.

2. The method according to claim 1, wherein said first configuration information being used for configuring the sidelink communication resources comprises: the first configuration information being used for configuring a resource pool of the sidelink communication, and
    wherein the resource pool comprises at least one resource allocation unit.

3. The method according to claim 1, wherein the resource allocation unit comprises a plurality of resource units, and the first configuration information comprises first indication information indicating the structure of the resource allocation unit as a first structure or a second structure, and
    wherein the first structure is a structure where the plurality of resource units comprised in the resource allocation unit are non-contiguous in a frequency domain, and the second structure is a structure where the plurality of resource units comprised in the resource allocation unit are contiguous in the frequency domain.

4. The method according to claim 2, wherein the first configuration information comprises eleventh indication information indicating a frequency domain resource allocation granularity of a PSSCH, the frequency domain resource allocation granularity comprising one or more resource allocation units.

5. The method according to claim 3, further comprising:
    transmitting a PSCCH and a PSSCH using the allocated one or more resource allocation units, the PSCCH being used to schedule the PSSCH, wherein the resource allocation unit has the first structure, and the PSCCH and the PSSCH are transmitted in the allocated one or more resource allocation units using at least one of: a Time Division Multiplexing (TDM) mode, a Frequency Division Multiplexing (FDM) mode, or a TDM+FDM mode, wherein:
    when the TDM mode is used, the resource for transmitting the PSCCH and the resource for transmitting the PSSCH overlap in a frequency domain but do not overlap in the time domain;
    when the FDM mode is used, the resource for transmitting the PSCCH and the resource for transmitting the PSSCH do not overlap in the frequency domain but overlap in the time domain; and
    when the TDM+FDM mode is used, the resource for transmitting the PSCCH and the resource for transmitting the PSSCH partially overlap in the frequency domain and partially overlap in the time domain;
    wherein one of the allocated one or more resource allocation units comprises n second time units in at least one first time unit in the time domain and m frequency units in the frequency domain; and the n second time units are used for transmitting a Physical Sidelink Control Channel (PSCCH) and a PSSCH; and
    said PSCCH and the PSSCH being transmitted using TDM+FDM mode comprises:
    the allocated one or more resource allocation units comprising a first resource allocation unit, the PSCCH being transmitted using a resource that comprises N second time units among the n second time units in the time domain and M frequency units in the first resource allocation unit in the frequency domain; and the PSSCH being transmitted using the other resource than the resource for transmitting the PSCCH in the allocated one or more resource allocation units, where M and m are positive integers, and $1 \leq N < n$, $1 \leq M < m$.

6. The method according to claim 5, wherein the first resource allocation unit is the first or last resource allocation unit in an ascending order of frequency among the allocated one or more resource allocation units, and/or the M frequency units are the first or last M frequency units in an ascending order of frequency among the first resource allocation unit.

7. The method according to claim 2, wherein the resource pool comprises K1 resource block sets (RB sets) each comprising K2 resource blocks, where K1 and K2 are positive integers.

8. The method according to claim 7, wherein a frequency domain starting position of the resource pool is same as a frequency domain starting position of a first resource block set in the K1 RB sets, the first resource block set being a resource block set with a lowest frequency domain position among the K1 RB sets, or a frequency domain ending position of the resource pool is same as a frequency domain ending position of a second resource block set in the K1 RB sets, the second resource block set being a resource block set with a highest frequency domain position among the K1 RB sets, or there is a guard band between two adjacent RB sets among the K1 RB sets.

9. The method according to claim 1, wherein the second configuration information further comprises indication information indicating a number of second time units comprised in the resource for transmitting the PSFCH.

10. The method according to claim 1, wherein the tenth indication information is comprised in the first configuration information.

11. The method according to claim 10, wherein at least two of the X transmission opportunities do not overlap in the time domain.

12. A network device, comprising:

a processor, a memory, and an interface configured to communicate with a terminal device, wherein the memory stores computer-executable instructions; and the processor executes the computer-executable instructions stored in the memory, such that the processor performs a resource allocation method comprising:

determining sidelink communication resources; and transmitting first configuration information to a terminal device, the first configuration information being used for configuring the sidelink communication resources and the first configuration information comprising information used for obtaining a structure of a resource allocation unit;

transmitting second configuration information to the terminal device, the second configuration information being used for configuring a transmission parameter for a Physical Sidelink Feedback Channel (PSFCH) in the sidelink communication resources, the second configuration information comprising indication information indicating at least one of: at least one PSFCH format used for the PSFCH, a frequency domain resource for transmitting the PSFCH, a time domain resource for transmitting the PSFCH, a first time unit where the PSFCH is located, or the resource allocation unit where the PSFCH is located, wherein the first time unit comprises at least one second time unit; and transmitting tenth indication information to the terminal device, wherein the tenth indication information indicates a number X of PSFCH transmission opportunities corresponding to one Physical Sidelink Shared Channel (PSSCH) in the sidelink communication resources, where X is a positive integer.

13. The network device according to claim 12, wherein said first configuration information being used for configuring the sidelink communication resources comprises: the first configuration information being used for configuring a resource pool of the sidelink communication, and wherein the resource pool comprises at least one resource allocation unit.

14. The network device according to claim 12, wherein the resource allocation unit comprises a plurality of resource units, and the first configuration information comprises first indication information indicating the structure of the resource allocation unit as a first structure or a second structure, and wherein the first structure is a structure where the plurality of resource units comprised in the resource allocation unit are non-contiguous in a frequency domain, and the second structure is a structure where the plurality of resource units comprised in the resource allocation unit are consecutive in the frequency domain.

15. The network device according to claim 13, wherein the first configuration information comprises eleventh indication information indicating a frequency domain resource allocation granularity of a PSSCH, the frequency domain resource allocation granularity comprising one or more resource allocation units.

16. The network device according to claim 14, wherein the resource allocation unit has the first structure, the sidelink communication resources are used for one or more resource allocation units in a terminal device for the terminal device to transmit the PSCCH and the PSSCH, and the PSCCH and the PSSCH are transmitted using at least one of: a Time Division Multiplexing (TDM) mode, a Frequency Division Multiplexing (FDM) mode, or a TDM+FDM mode, wherein:

when the TDM mode is used, the resource for transmitting the PSCCH and the resource for transmitting the PSSCH overlap in a frequency domain but do not overlap in the time domain;

when the FDM mode is used, the resource for transmitting the PSCCH and the resource for transmitting the PSSCH do not overlap in the frequency domain but overlap in the time domain; and when the TDM+FDM mode is used, the resource for transmitting the PSCCH and the resource for transmitting the PSSCH partially overlap in the frequency domain and partially overlap in the time domain;

wherein one of the one or more resource allocation units comprises n second time units in at least one first time unit in the time domain and m frequency units in the frequency domain; and the n second time units are for transmitting a PSCCH and a PSSCH; and said PSCCH and the PSSCH being transmitted using a TDM+FDM mode comprises:

the one or more resource allocation units comprising a first resource allocation unit, the PSCCH being transmitted using a resource that comprises N second time units among the n second time units in the time domain and M frequency units in the first resource allocation unit in the frequency domain; and the PSSCH being transmitted using the other resource than the resource for transmitting the PSCCH in the one or more resource allocation units, where M and m are positive integers, and $1 \leq N < n$, $1 \leq M < m$.

17. The network device according to claim 16, wherein the first resource allocation unit is the first or last resource allocation unit in an ascending order of frequency among the one or more resource allocation units, and/or the M frequency units are the first or last M frequency units in an ascending order of frequency among the first resource allocation unit.

18. The network device according to claim 13, wherein the resource pool comprises K1 RB sets each comprising K2 resource blocks, where K1 and K2 are positive integers.

19. The network device according to claim 18, wherein a frequency domain starting position of the resource pool is same as a frequency domain starting position of a first resource block set in the K1 RB sets, the first resource block set being a resource block set with a lowest frequency domain position among the K1 RB sets, or a frequency domain ending position of the resource pool is same as a frequency domain ending position of a second resource block set in the K1 RB sets, the second resource block set being a resource block set with a highest frequency domain position among the K1 RB sets, or there is a guard band between two adjacent RB sets among the K1 RB sets.

20. A terminal device, comprising:

a processor, a memory, and an interface configured to communicate with a network device, wherein the memory stores computer-executable instructions; and the processor executes the computer-executable instructions stored in the memory, such that the processor performs the method according to claim 1.

\* \* \* \* \*